Aug. 23, 1955     H. G. CROUCHER     2,715,942
KEYBOARD CONTROLLED MECHANISMS FOR USE IN THE PRODUCTION
OF LINES OR PATTERNS OF TYPOGRAPHICAL AND LIKE MATTER
Filed June 1, 1951     24 Sheets-Sheet 1

INVENTOR
Henry G. Croucher
BY Hall & Houghton
ATTORNEYS

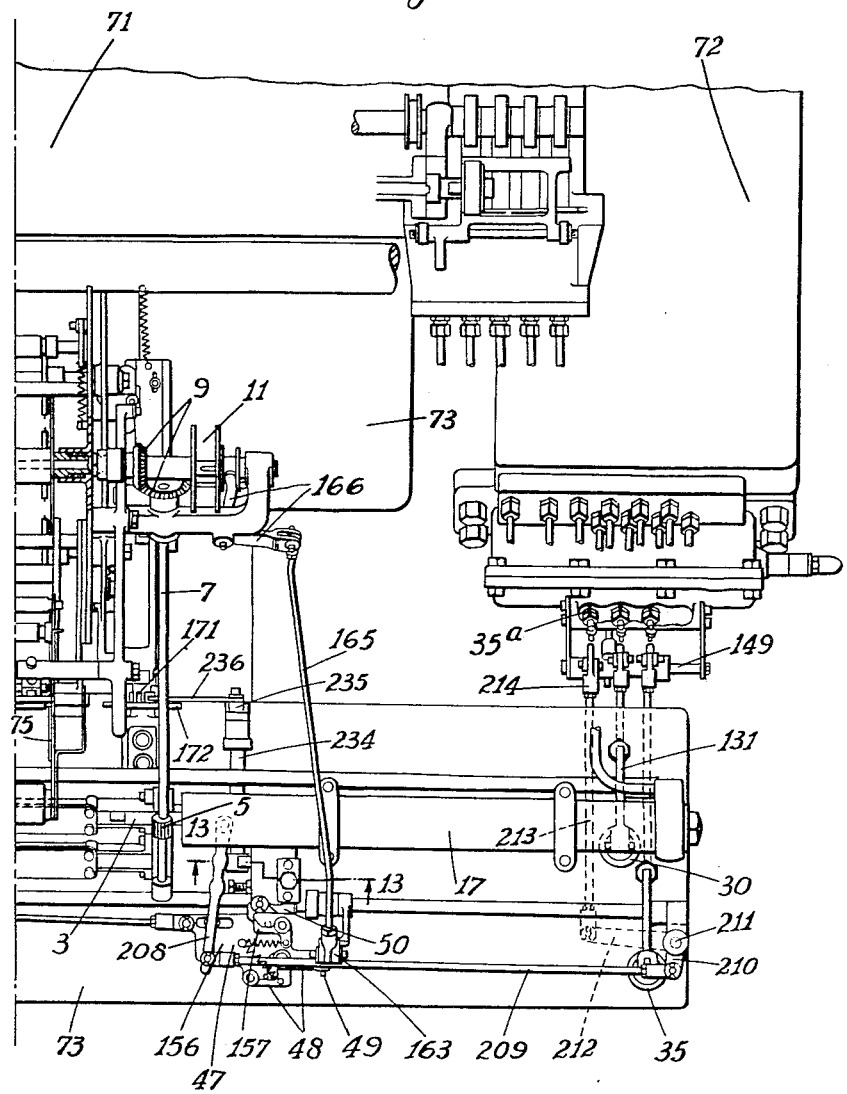

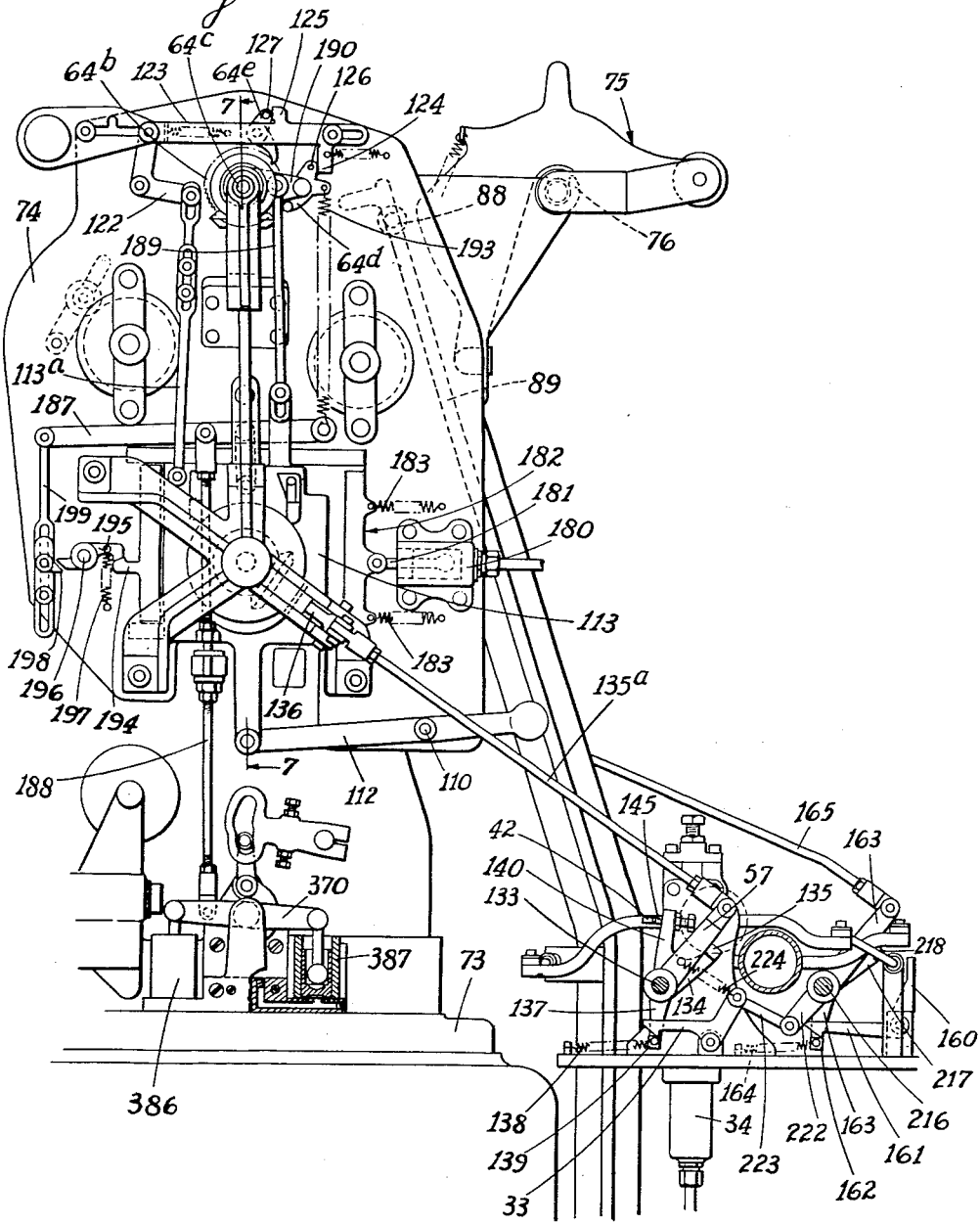

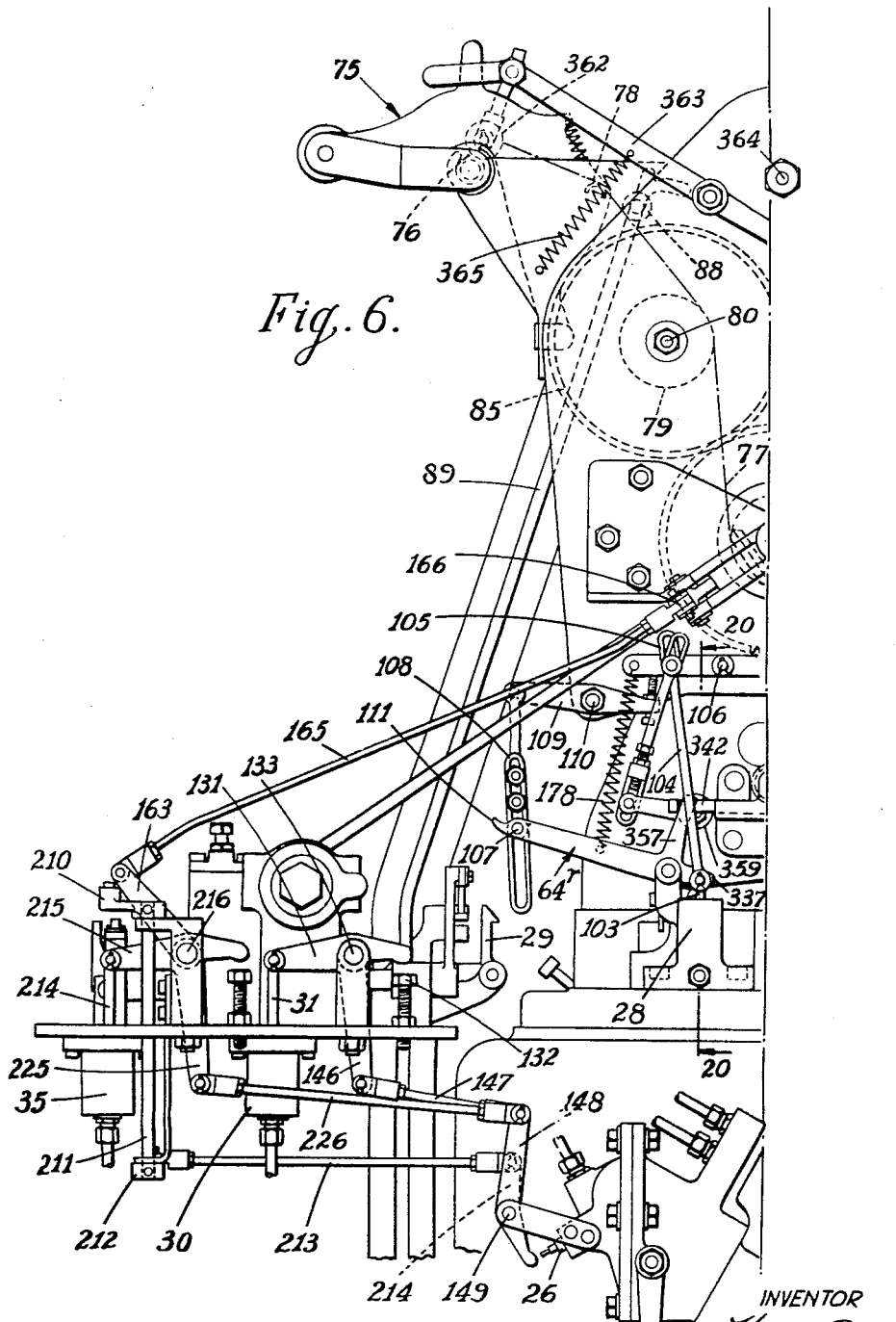

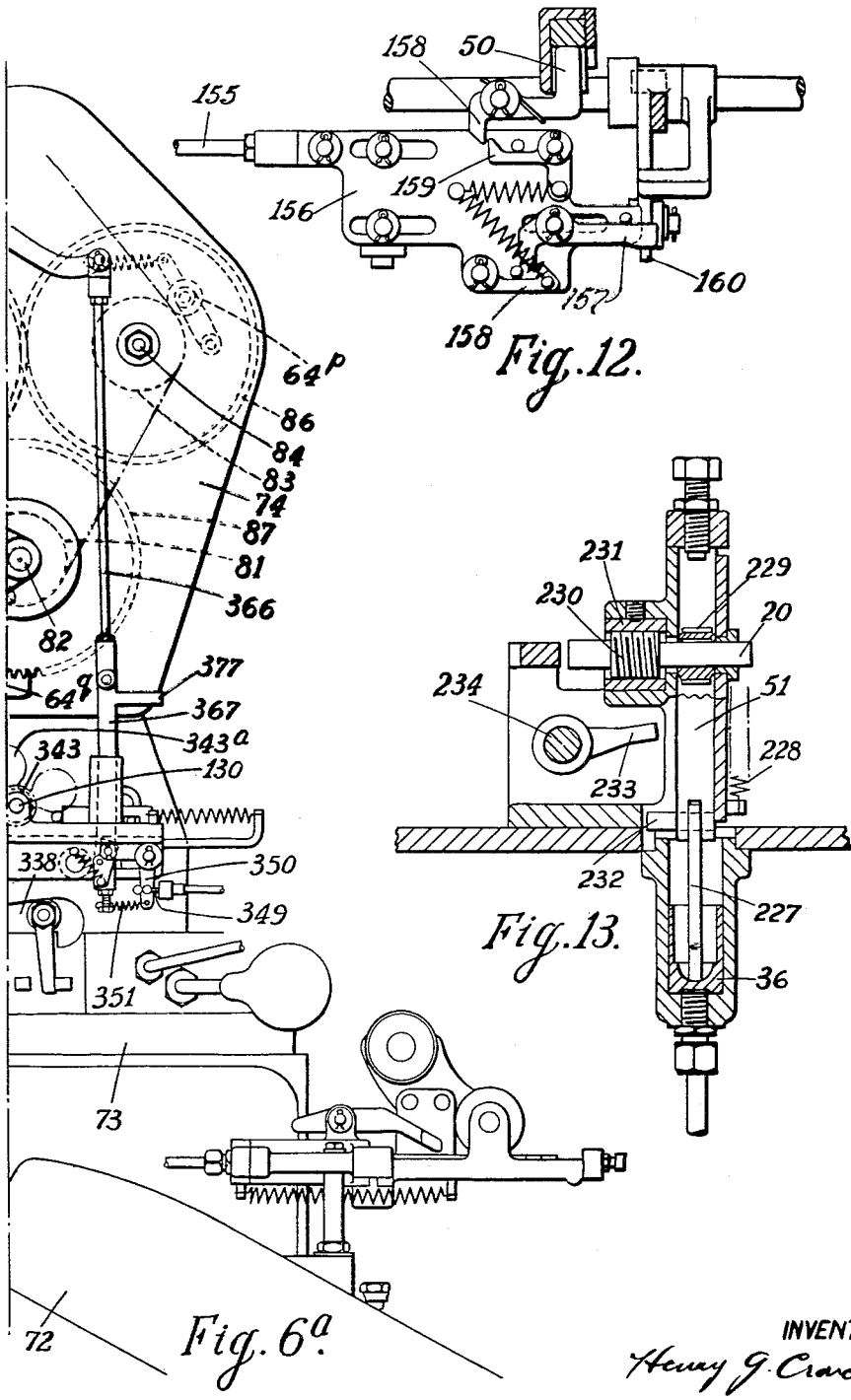

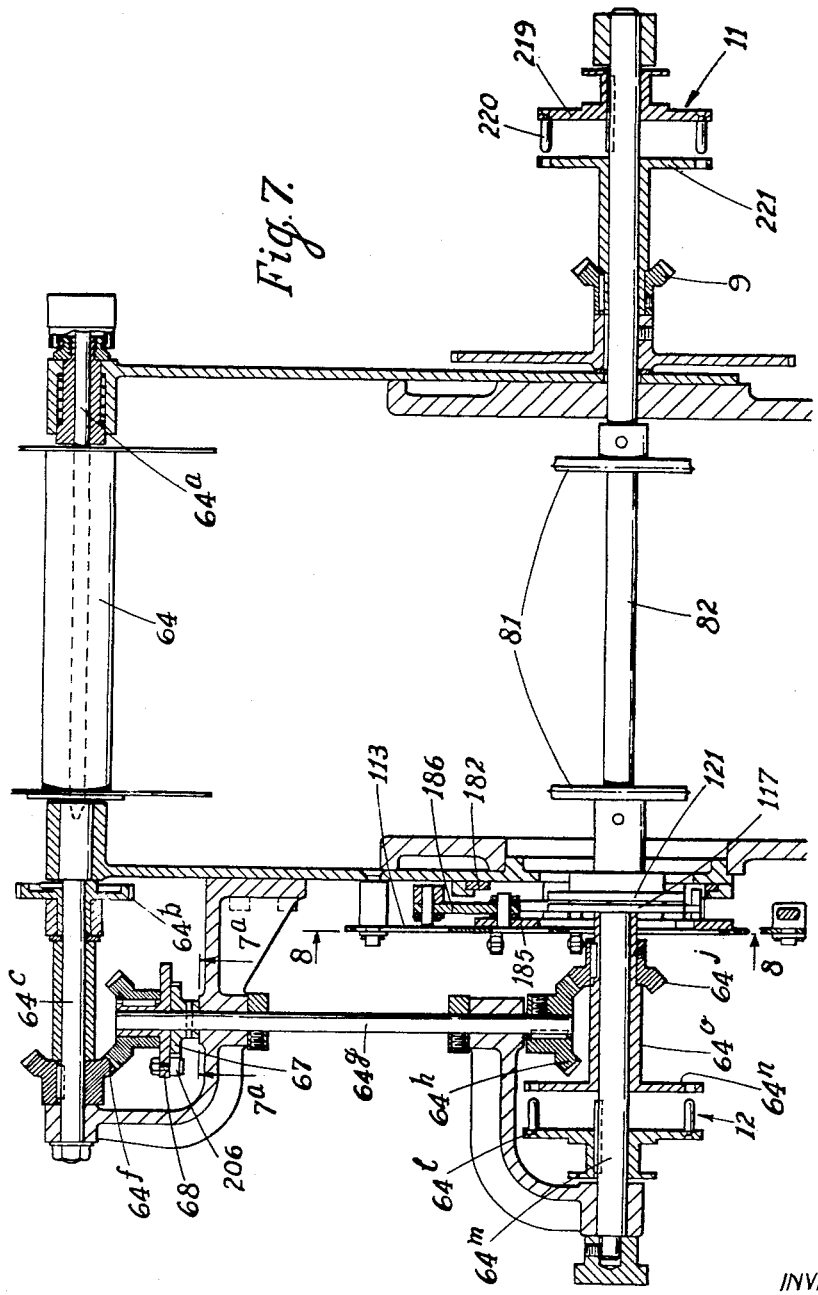

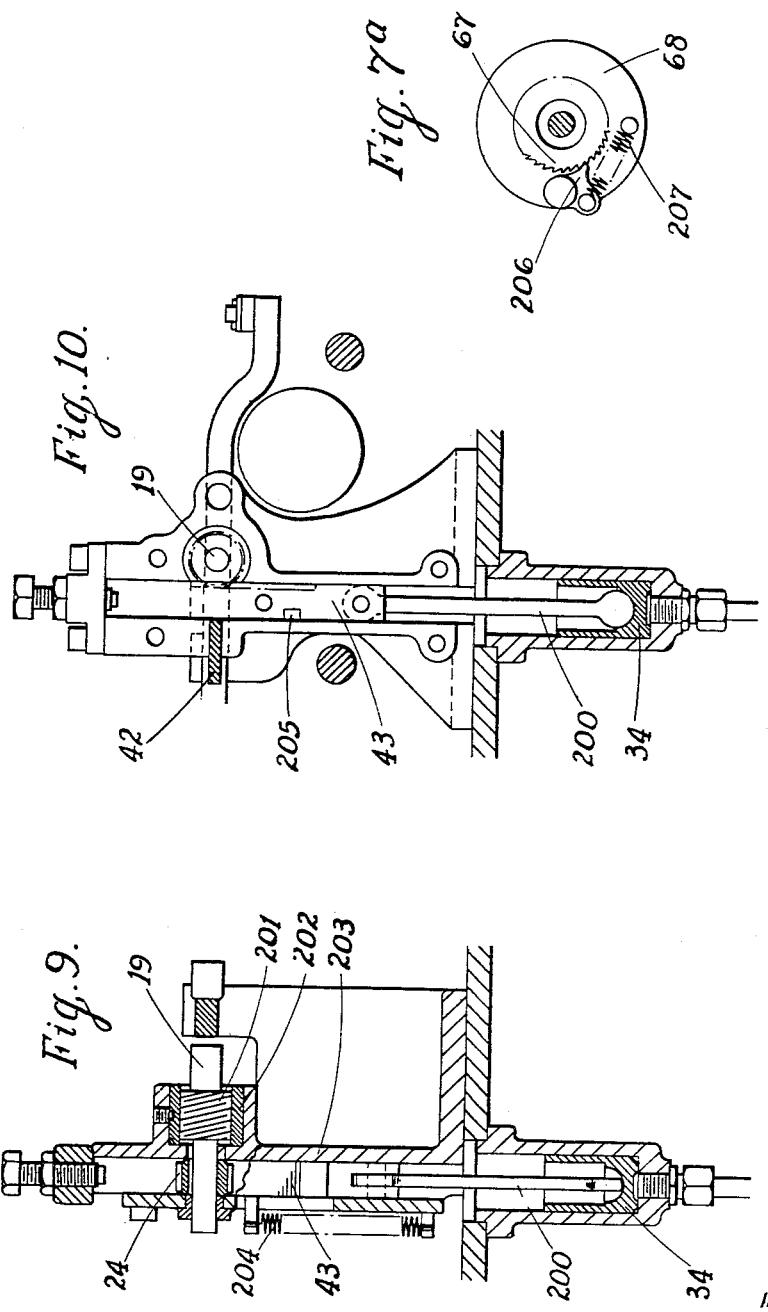

INVENTOR
Henry G. Croucher
BY
Hall & Houghton
ATTORNEYS

Aug. 23, 1955  H. G. CROUCHER  2,715,942
KEYBOARD CONTROLLED MECHANISMS FOR USE IN THE PRODUCTION
OF LINES OR PATTERNS OF TYPOGRAPHICAL AND LIKE MATTER
Filed June 1, 1951  24 Sheets-Sheet 12
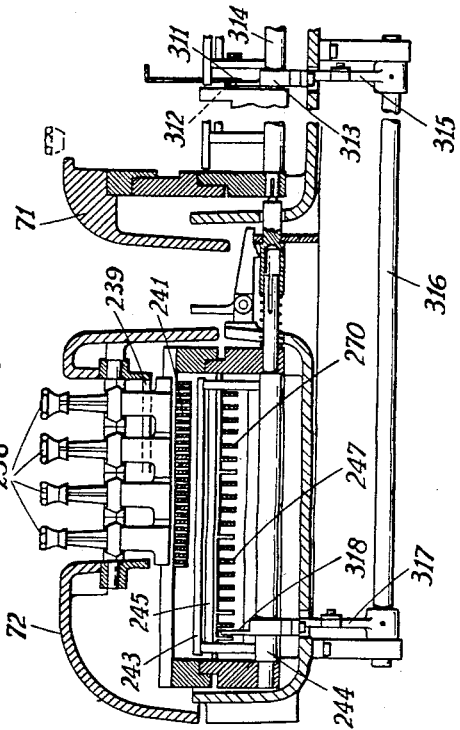
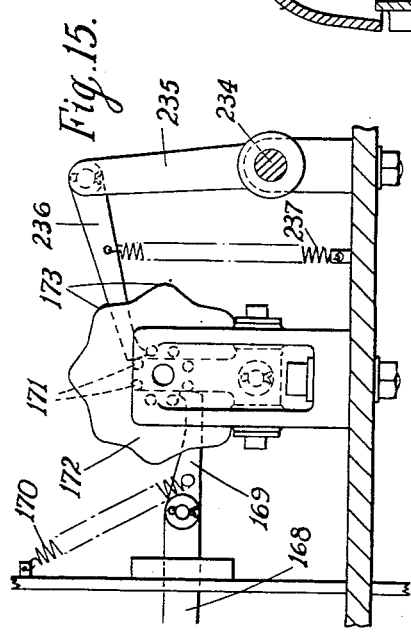
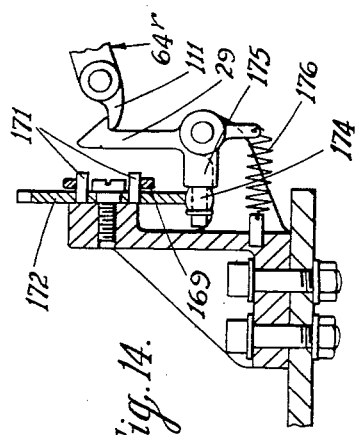
INVENTOR
Henry G. Croucher
BY
Hall & Houghton
ATTORNEYS

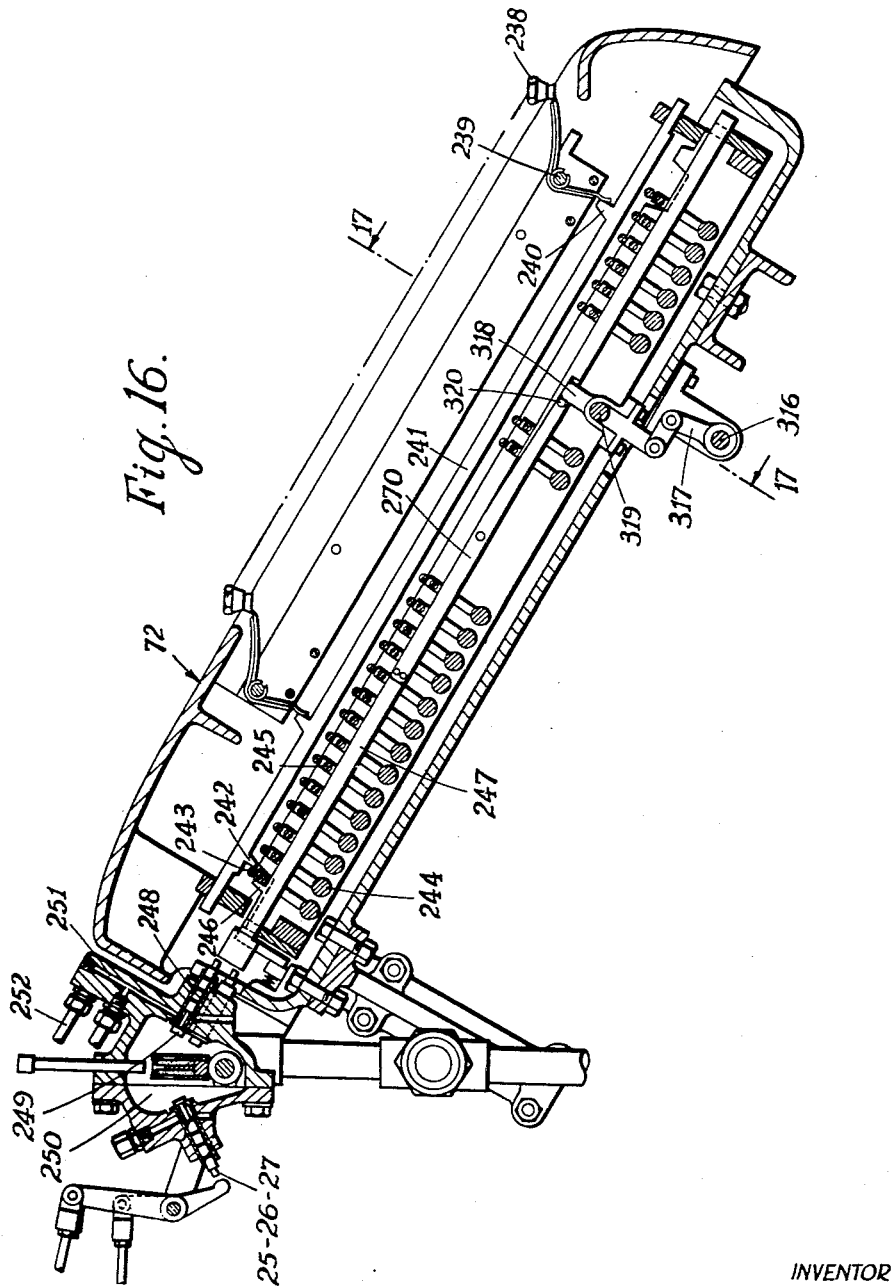

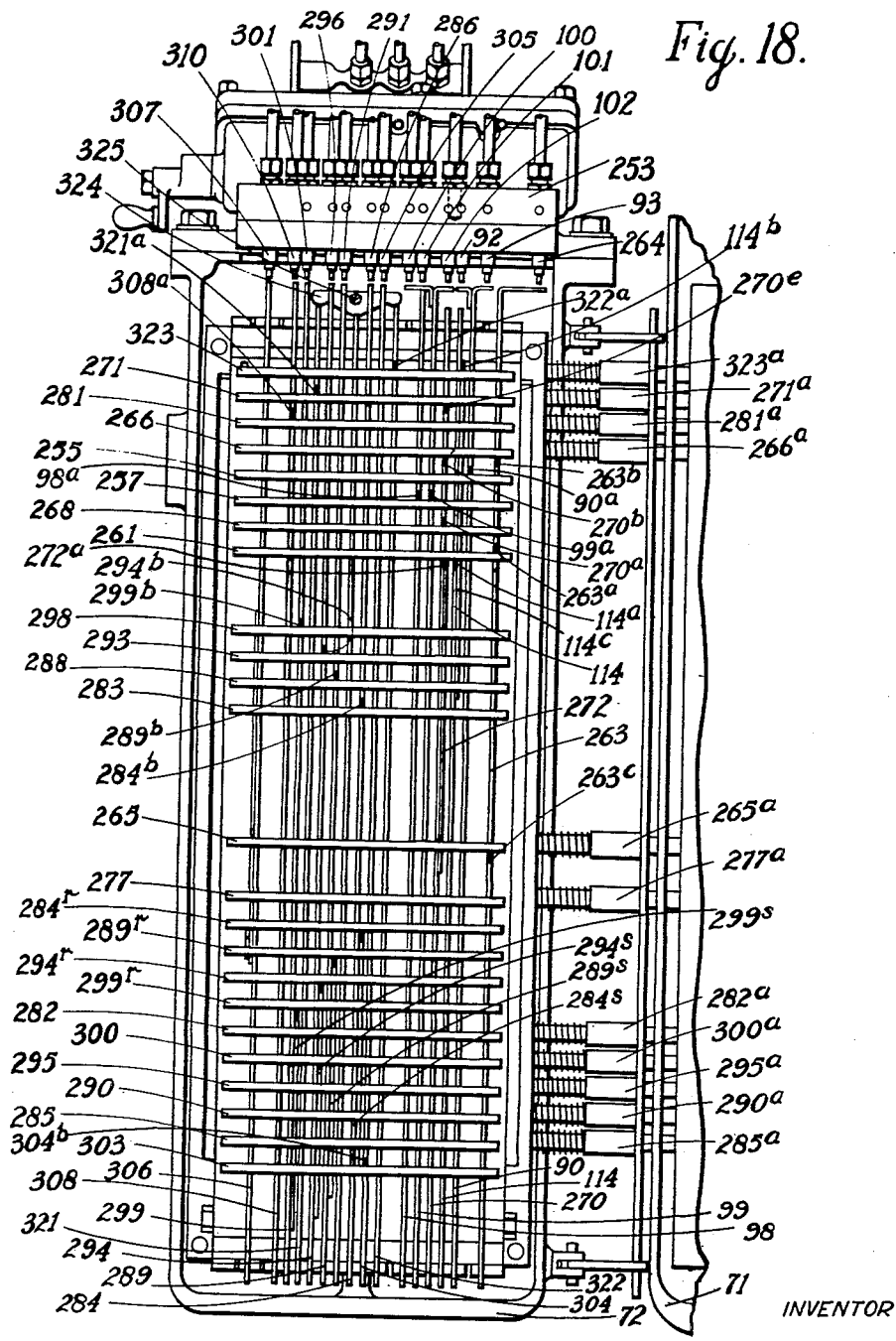

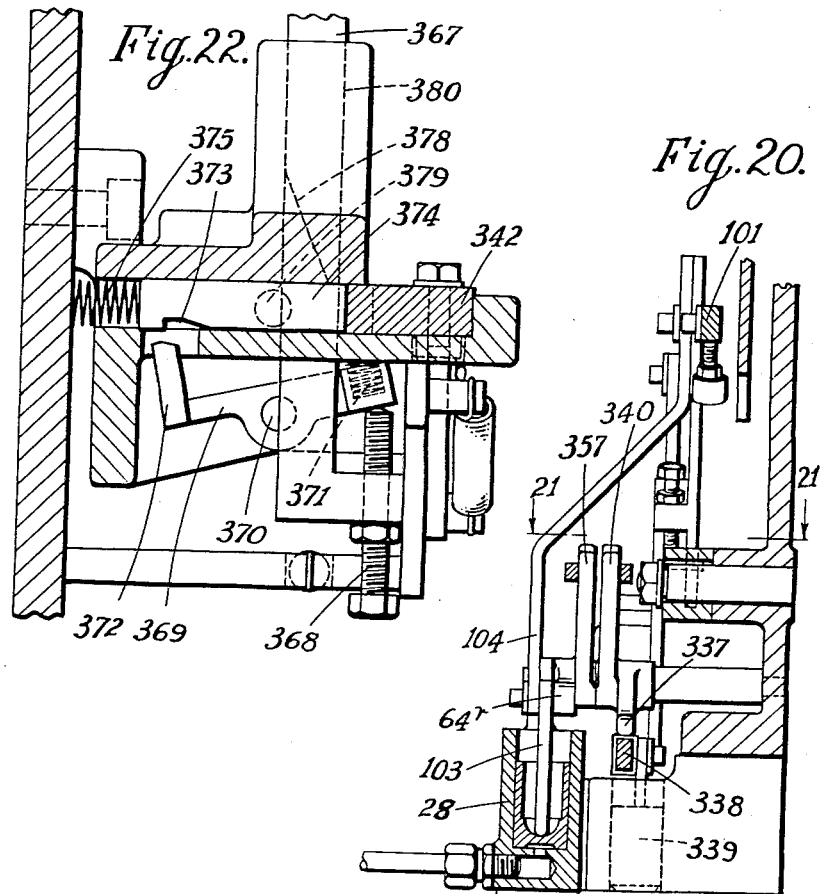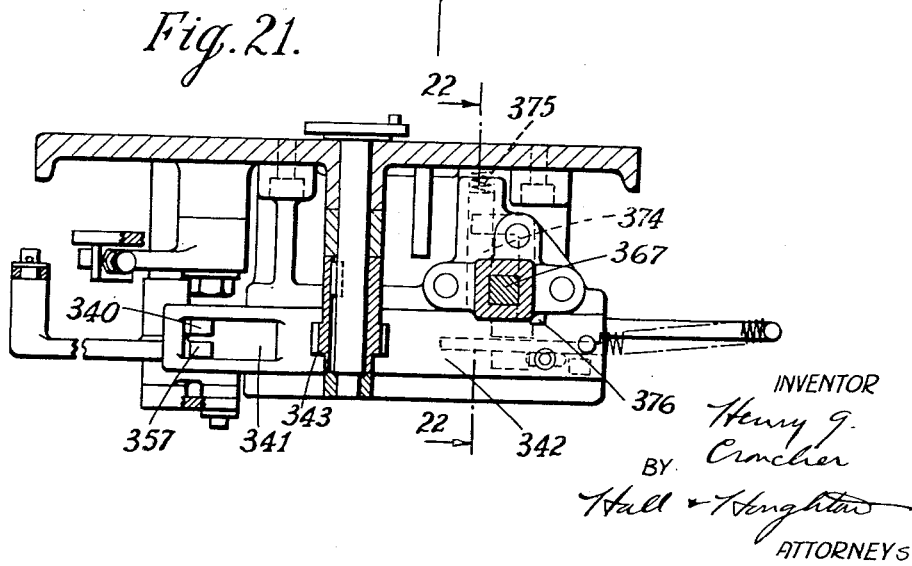

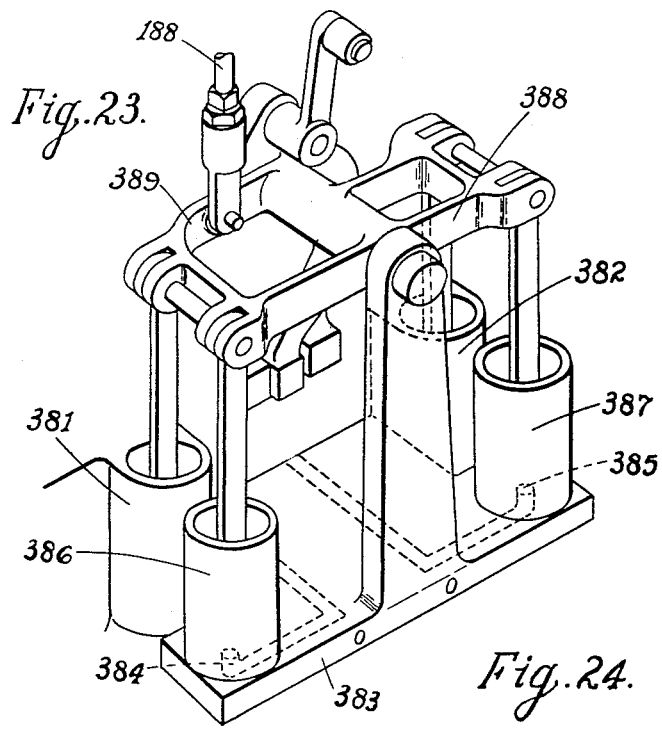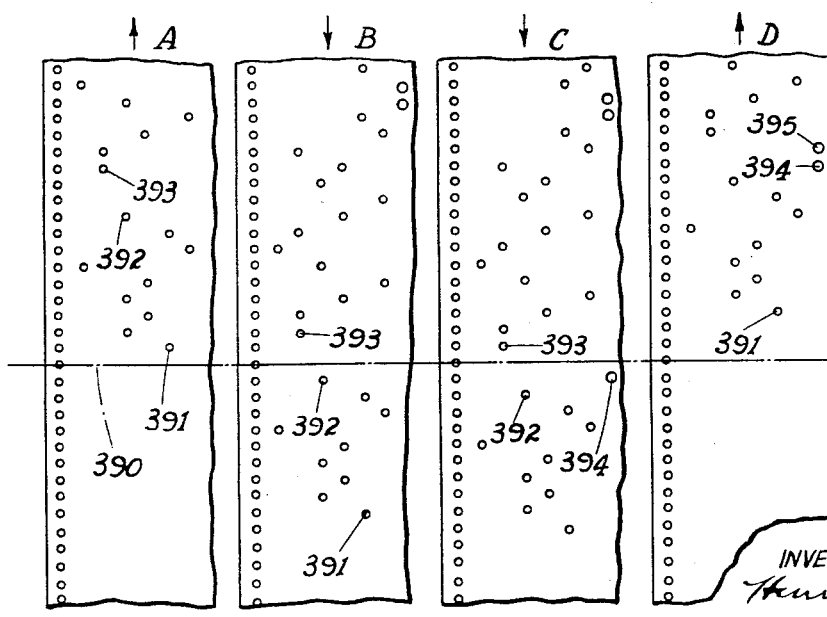

Aug. 23, 1955     H. G. CROUCHER     2,715,942
KEYBOARD CONTROLLED MECHANISMS FOR USE IN THE PRODUCTION
OF LINES OR PATTERNS OF TYPOGRAPHICAL AND LIKE MATTER
Filed June 1, 1951     24 Sheets-Sheet 18
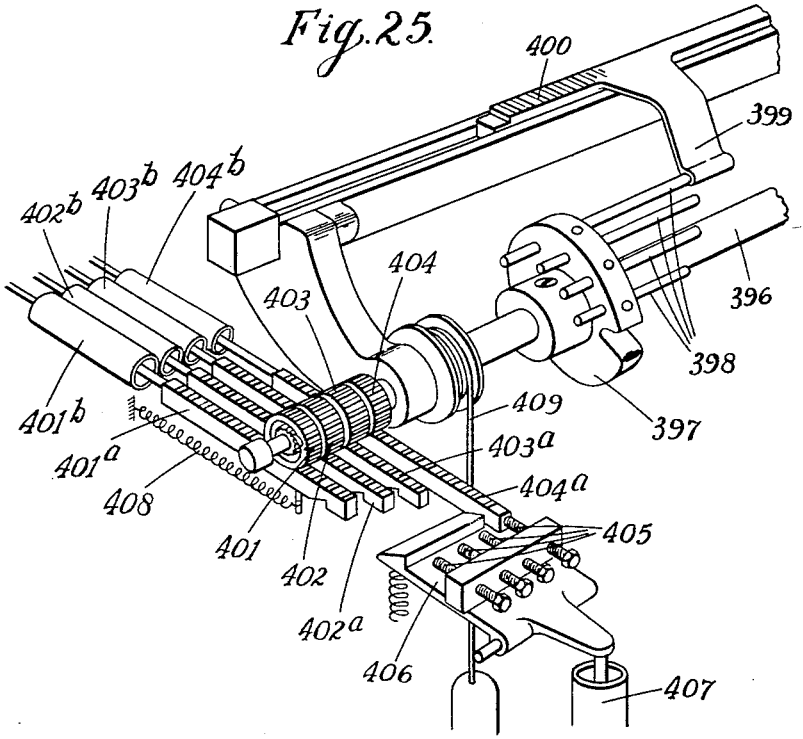
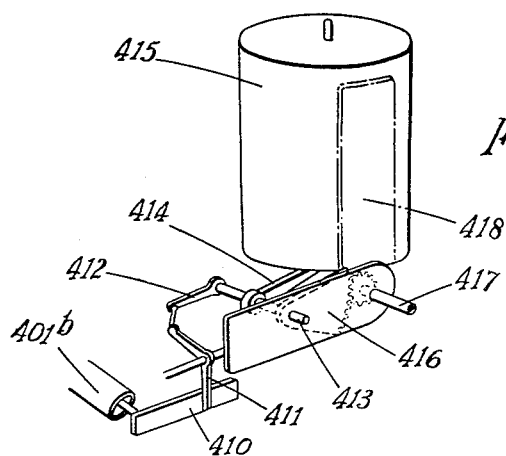
INVENTOR
Henry G. Croucher
BY
Hall & Houghton
ATTORNEYS

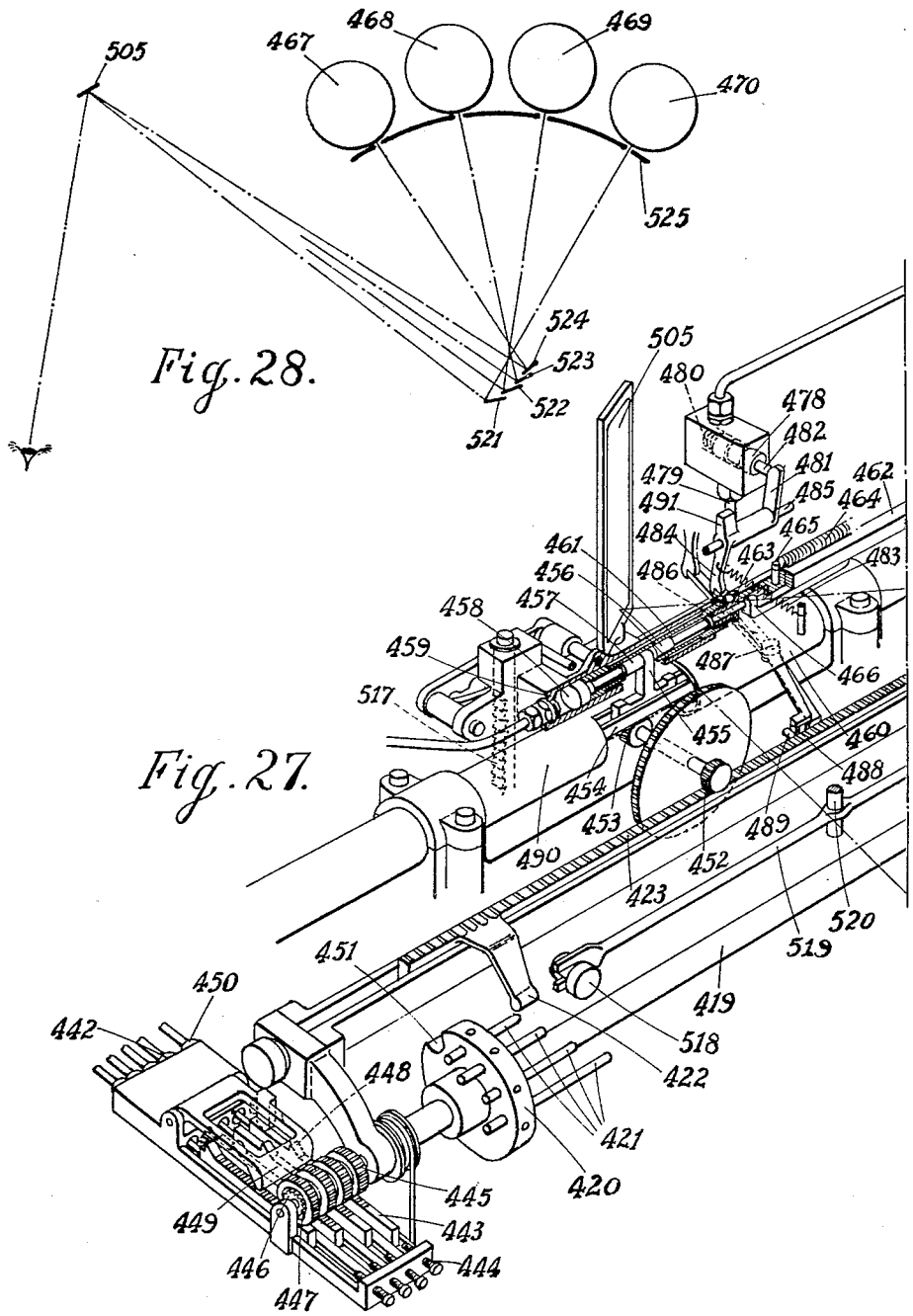

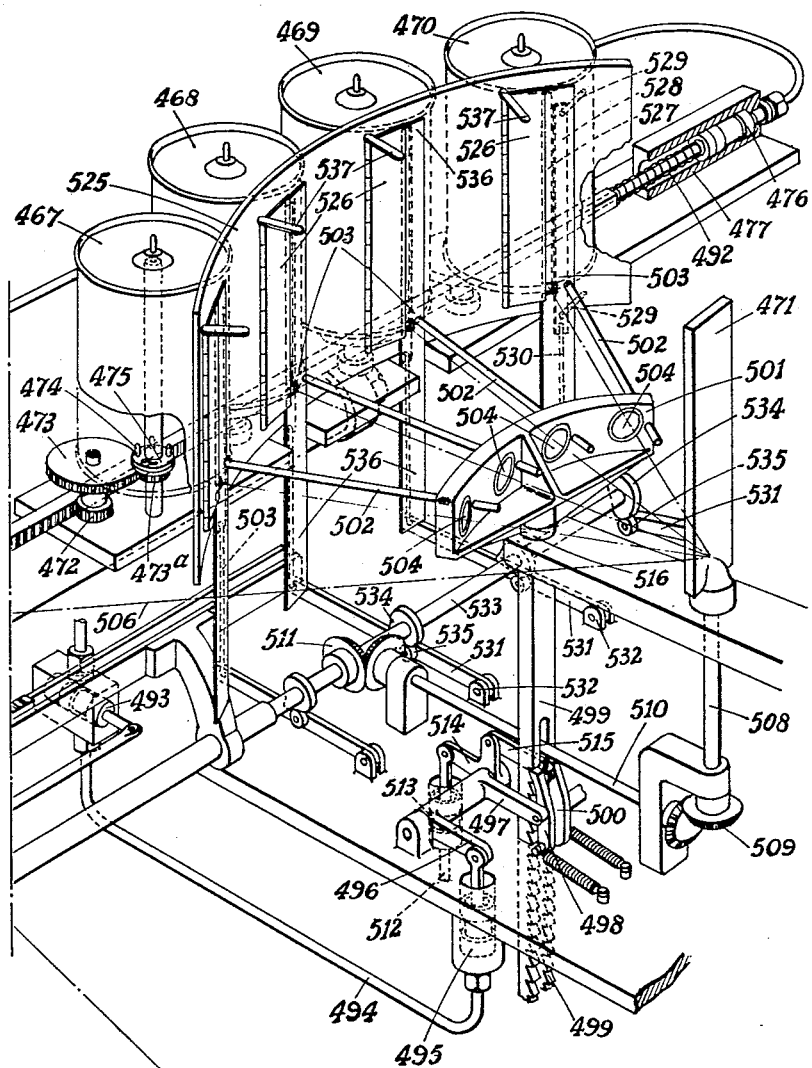
Fig. 27.ª

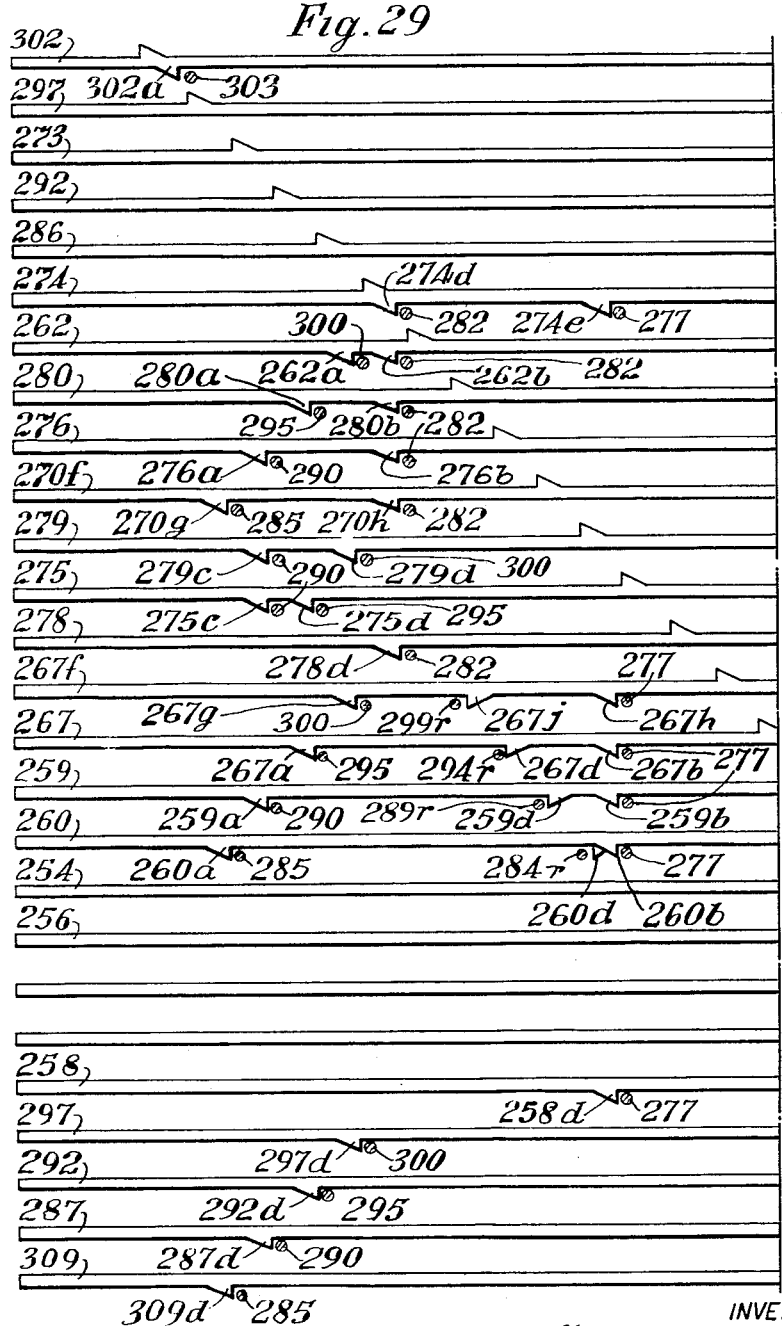

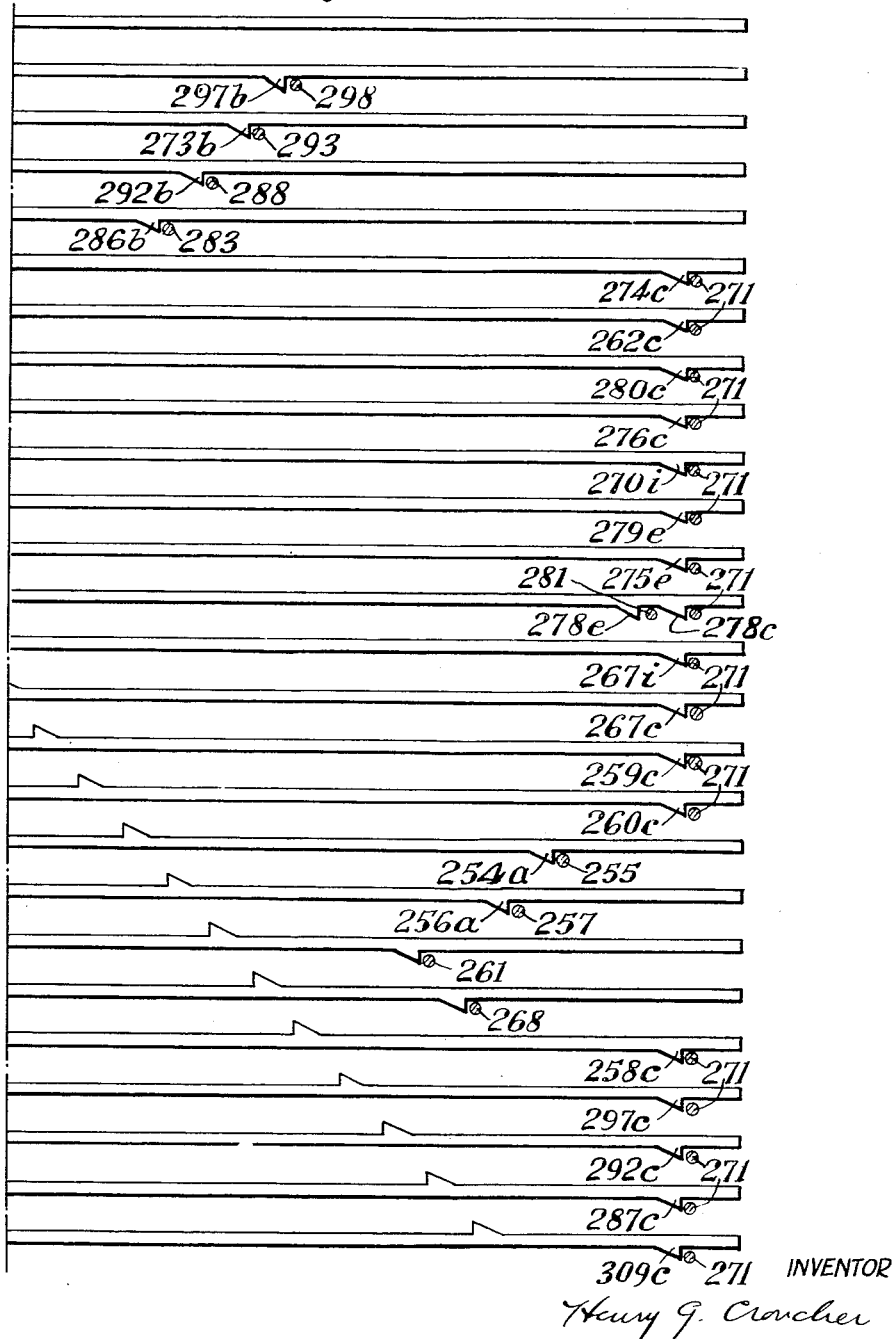

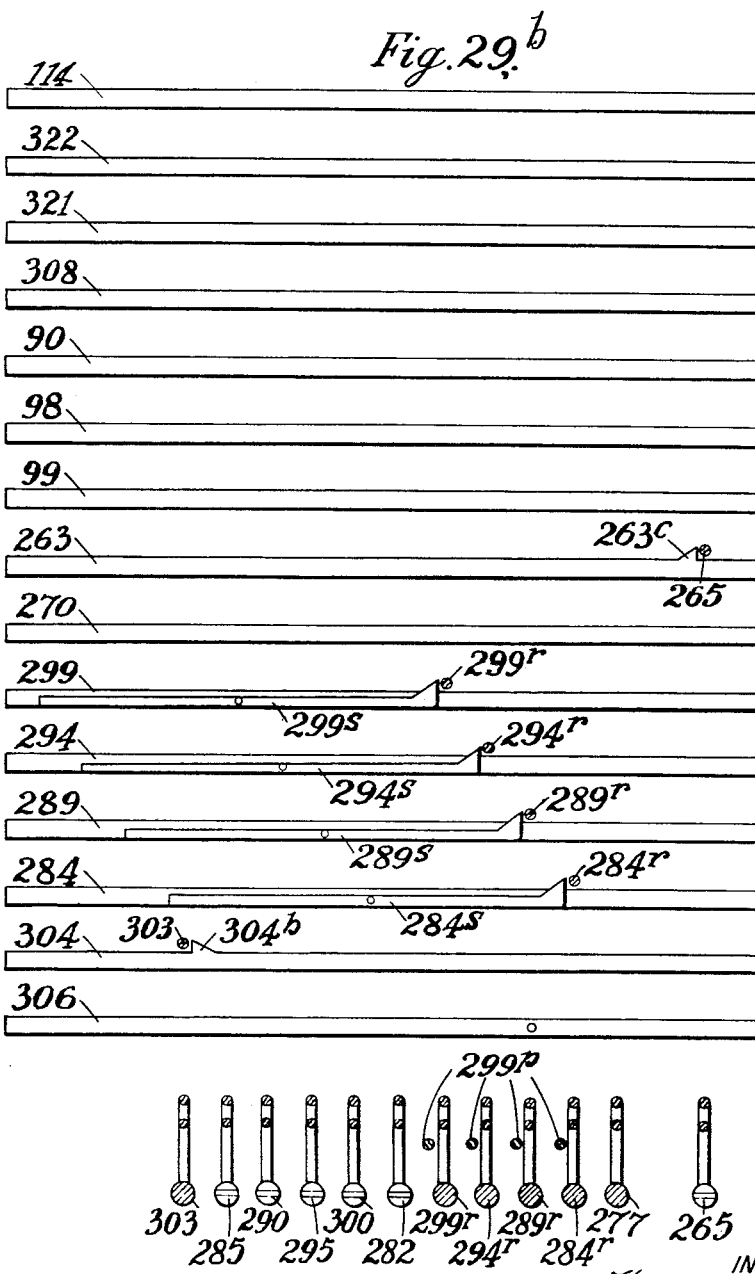

Fig. 29C.
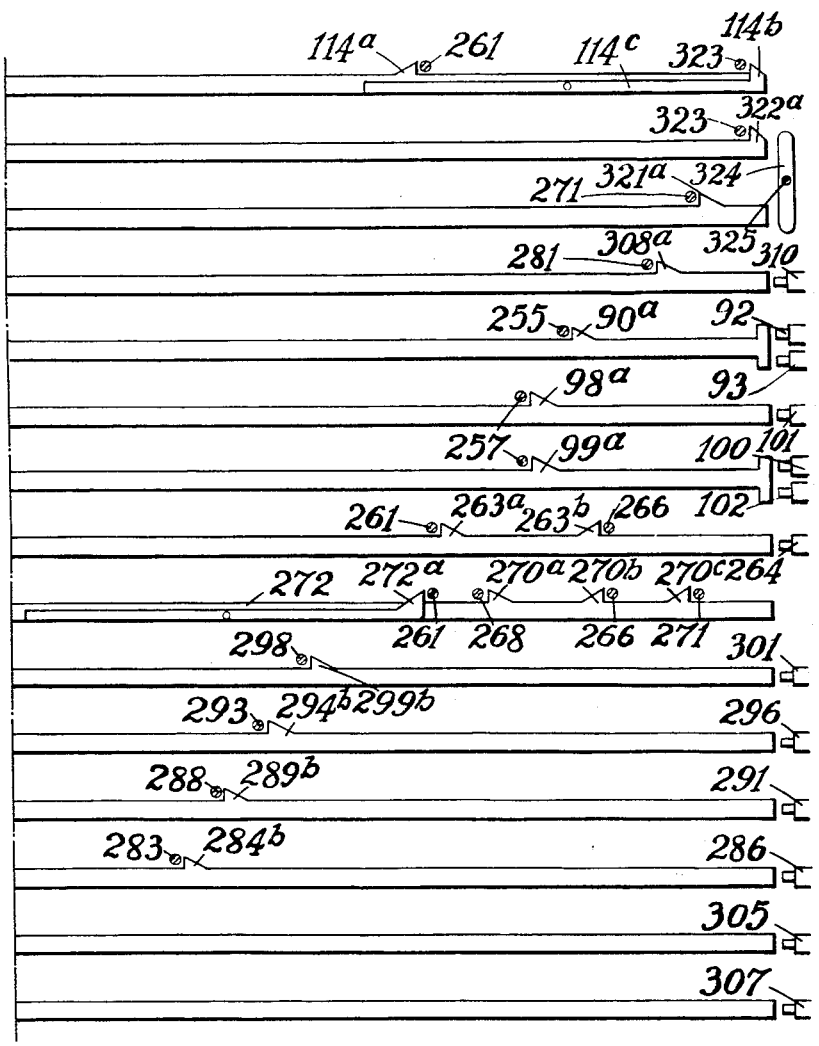
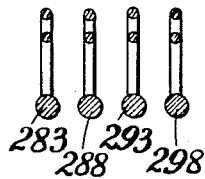
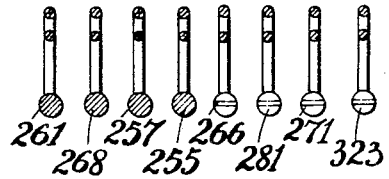

United States Patent Office 2,715,942
Patented Aug. 23, 1955

2,715,942

KEYBOARD CONTROLLED MECHANISMS FOR USE IN THE PRODUCTION OF LINES OR PATTERNS OF TYPOGRAPHICAL AND LIKE MATTER

Henry George Croucher, Beccles, England, assignor, by mesne assignments, to The Monotype Corporation Limited, London County, England Application June 1, 1951, Serial No. 229,341

58 Claims. (Cl. 164—112)

This invention relates to key device reversing a tape to allow placing justification holes at start of a line and varying line measure by keys, including the composing of type and the production of impressions or characters in or for printing arranged in spaced linees or patterns. Hitherto the record-bearing means, usually a perforated paper strip, produced by such mechanisms has been used to control the sequence of operations incidental to type composing in the reverse order to that of the production of the records, i. e. the final record made on the strip or other means is the first to effect the control of the composing machine. The reason for this is that in the production of justified lines of type or characters, suitable records or perforations must be provided at the end of each line to control mechanism which determines the spacing of the characters in that line so that all lines shall be of equal or predetermined length. It is one of the objects of the present invention to provide an improved keyboard controlled mechanism of the kind described for producing a record-bearing means which can be employed to effect the desired sequence of operations in the direct order, i. e. to control the production and composing of type or the like or the production of printed or otherwise reproduced characters by any desired means, including the justification of lines, from the beginning of the first line of characters instead of in the opposite sense as hitherto. A further object is to enable a record-bearing means of the above character to be produced by keyboard manipulations which follow a similar sequence to those of known keyboard mechanisms.

Another object is to provide an improved keyboard mechanism in which the travelling record-bearing means can be reversed or set back when required in a simple and convenient manner.

Another object is to provide improved keyboard mechanism including means for effecting a locking of the mechanism for producing record bearing means when required or after the production of a predetermined number of lines or characters.

Another object is to provide a keyboard mechanism including improved means for counting the number of lines of characters produced.

Another object is to provide an improved keyboard mechanism which can be operated more rapidly and with lighter pressure on the keys than existing keyboard mechanisms.

Other objects include the provision of improved indicating means for the assistance of the keyboard operator, improved means for enabling combinations of operations previously individually controlled by existing keyboard mechanisms to be readily effected, means for varying the line measure by the operation of appropriate keys, and means which obviate the changing by the operator of the ready reckoner or justifying scale drums when the line measure is changed.

The invention may be applied to the controlling of single-type composing machines of the kind described in British patent specification No. 8,633 of 1899 and to machines known under the registered trade mark "Monotype," and to keyboard mechanisms as described in British patent specification No. 17,199 of 1908 (duplicate of U. S. 944,405, granted December 28, 1909). The invention can also be applied to machines for producing type faced impressions or characters as described in the specification of British patent application No. 6,848 of 1949, William Clowes & Sons Ltd. and Henry George Croucher, and may be combined with apparatus for controlling sequences of operations as described in the specification of British patent application No. 13,961 of 1950, William Clowes & Sons Ltd. and Henry George Croucher, but is not restricted to such uses.

The invention comprises means in combination with a keyboard controlled mechanism of the kind described for causing reversed motion of the record-bearing means or strip over an appropriate distance upon the completion of records or perforations corresponding to a line of characters so that the record which determines the character spacing in such line can be positioned in advance of the records of characters constituting the line, and means for subsequently returning the record-bearing means or strip to a position for commencing the formation of records or perforations for the succeeding line.

The invention also comprises mechanism in accordance witth the preceding paragraph including means for causing advance of the record-bearing means or strip previous to the formation of character controlling records or perforations so as to afford a space in which the record (or records) which determines the character spacing in such line is subsequently provided.

The invention also comprises mechanism in accordance with both of the two preceding paragraphs including measuring means actuated by mechanism feeding the record-bearing means or strip, for automatically determining the appropriate reverse travel and return travel of said means. In a convenient arrangement according to the invention such measuring means comprise pinion actuated racks operable, e. g. under the control of clutches, and displaceable in accordance with the travel of the perforated strip or the like, said racks being returned to stops which are adjusted prior to their return, so that the reverse and return motions of the strip or the like are greater than the length of the records constituting a line of characters by amounts determined by the adjustment of said stops.

The invention also comprises mechanism according to each of the three preceding paragraphs in which the displacements of the record-bearing means or strip are controlled by keys which are preferably additional to the keys of the existing keyboard, such keyboard for example as is described in British patent specification No. 17,199 of 1908, and are preferably accommodated in a separate key bank which can be attached in any convenient manner to the existing keyboard.

The measuring means or racks may be operated by air pistons under the control of valves which are operated by the additional keys referred to above.

During the reversal movement of the paper strip, a loop is formed adjacent the supply spool, and such loop is conveniently controlled by a gravity roller slidable in guides. Upon the replacement motion of the strip, a drive is applied to the usual winder which receives the perforated strip so that the said loop is taken up preparatory to the formation of the perforations corresponding to the succeeding line.

According to a further feature of the invention means is provided for locking the normal paper feed mechanism when reversal and replacement of the paper strip is being effected. This may conveniently be effected by a compressed air piston which is operated when either the reversal displacement or replacement key is depressed, the piston engaging the existing locking mechanism to actuate the same.

According to a further feature of the invention, actuation of the above mentioned locking means is effected from a suitable line counter after a predetermined number of lines have been counted. This feature may be employed independently of other features of the invention referred to herein.

According to a further feature of the invention, means for operating the line counter is arranged so that operation occurs only when both single and double justifying keys are depressed simultaneously. This may conveniently be effected by the provision of a pivoted lever on a sliding member for counter operation, the lever being engageable by the single and double justification operating bars so that the sliding member is actuated only when both bars are advanced simultaneously. This feature may be employed independently of other features of the invention referred to herein.

According to a further feature of the invention means is provided for increasing the power for operating the paper feed mechanism so that a lighter and faster touch on the keyboard can be employed.

According to a further feature of the invention, means is provided for varying the line measure by the operation of appropriate keys.

According to a further feature of the invention, means is provided for automatically indicating the required change in the ready reckoner drum when changing the line measure.

According to a further feature of the invention, means is provided enabling the paper strip to be set back one step when required without perforation in order to allow error correction, such action being controlled by an additional key which may be accommodated in the additional key bank referred to previously.

According to a further feature of the invention, additional keys are provided for effecting combinations of perforations as required in apparatus for making up and correcting as described in the specification of British patent application No. 13,961 of 1950.

According to a further feature of the invention a plurality of ready reckoner or justifying scale drums are provided corresponding to the different line measures required, and means is also provided to ensure that the operator can only view the operative drum. This feature may be employed independently of the other features referred to previously, or in conjunction with the means for varying the line measure but independently of the line reversal means.

Further features will be described in the following examples and defined in the claims. References to the existing apparatus are to be understood as that described in British patent specification No. 17,199 of 1908 (a duplicate of U. S. Patent No. 944,405) or such known under the registered trademark "Monotype."

In the accompanying drawings:

Figures 4 and 4a are plan views of a complete mechanism according to the invention as associated with a known keyboard;

Figure 5 is an end elevation of the mechanism as viewed from the left-hand side of Figure 4;

Figures 6 and 6a are end elevations of the mechanism as viewed from the right-hand side of Figure 4a;

Figure 7 is a view taken on the line 7—7 of Figure 5;

Figure 7a is a section taken on the line 7a—7a of Figure 7;

Figure 9 is a sectional view taken on the line 9—9 of Figure 4;

Figure 10 is an end view, partly in section, of the stop device shown in Figure 9;

Figure 12 is a detailed elevation of the trip plate mechanism for the replacement rack stop;

Figure 13 is a sectional view of the replacement rack stop taken on the line 13—13 of Figure 4a;

Figure 14 is a sectional elevation of the latch mechanism for the lever controlling the paper feed;

Figure 15 is an end view of the mechanism of Figure 14;

Figure 16 is a longitudinal section of the additional key bank according to the invention;

Figure 17 is a cross section of the additional key bank taken on the line 17—17 of Figure 16;

Figure 18 is a plan view of the additional key bank with the keys and key bars omitted;

Figure 20 is a sectional view taken on the line 20—20 of Figure 6;

Figure 21 is a sectional view taken on the line 21—21 of Figure 20;

Figure 22 is a sectional view taken on the line 22—22 of Figure 21;

Figure 23 is a perspective view of the improved compressed air arrangement for operating the paper feed mechanism;

Figure 24 is a diagram showing the positions of the paper strip during the reversal displacement and replacement operations for the provision of the justification perforations;

Figure 25 is a perspective view of a mechanism employed for varying the measure of line length by key operation;

Figure 26 is a perspective view of the mechanism for indicating the required change in the ready reckoner or justifying scale drum when changing the line measure;

Figures 27 and 27a are perspective views of a modified mechanism for varying the measure of line length in conjunction with multiple ready reckoner or justifying scale drums and means for ensuring that only one drum can be read by the operator;

Figure 28 is a diagram showing a modified arrangement of the drums and reflecting mirrors of the mechanism shown in Figure 27.

Figures 29, 29a, 29b and 29c are a diagram showing key bar and valve bar arrangements for use in conjunction with mechanism according to the invention.

The invention will be described as applied by way of example to keyboard mechanism according to British patent specification No. 17,199 of 1908. Displacements of the paper strip for the purpose of placing the well known line justification perforations ahead of the perforations corresponding to the characters constituting the line are controlled by a pair of additional keys which will be referred to for convenience as reversal displacement and replacement keys respectively. These keys are carried in an additional key bank which is illustrated in Figures 16, 17 and 18 and will be described hereinafter.

Figure 1:
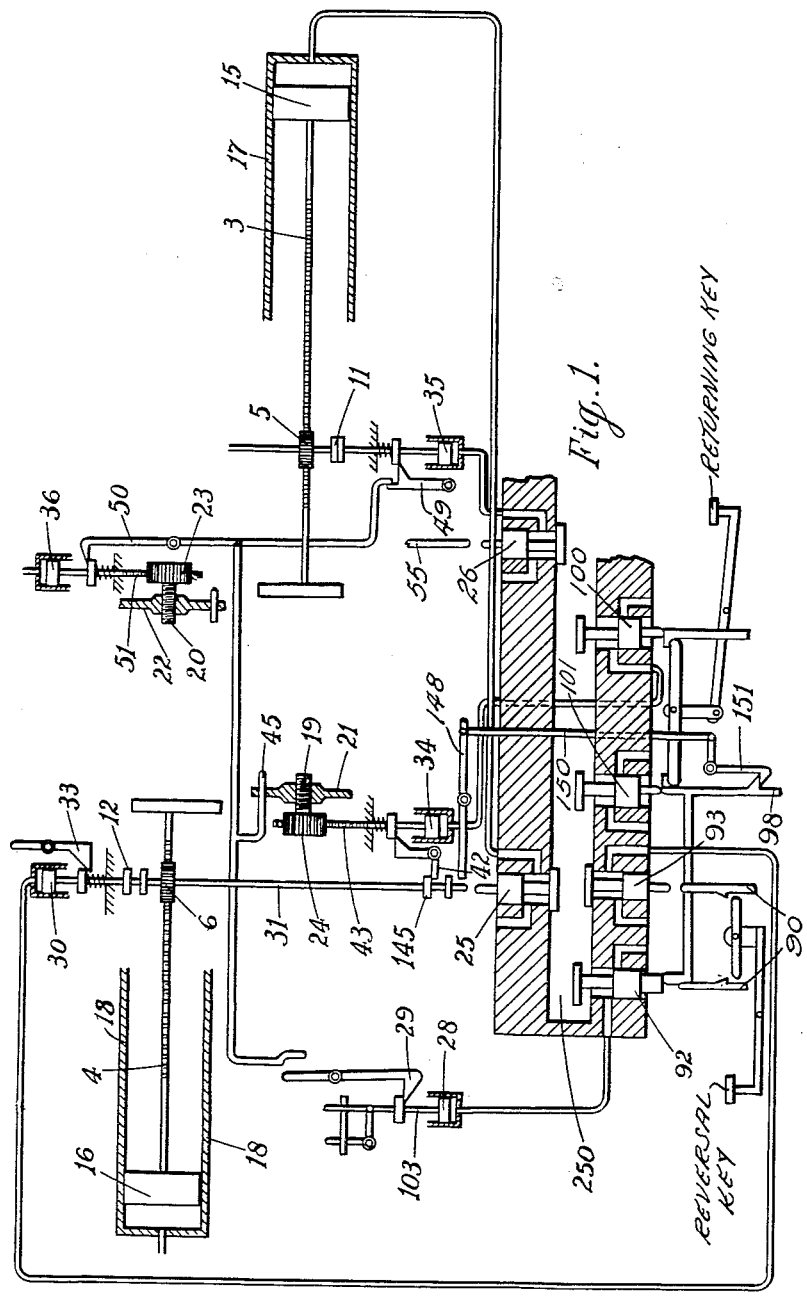
Figures 1 and 2 are diagrams showing the connections of the various mechanisms operated by the reversal displacement and replacement keys in accordance with the present invention, Figure 2 being similar to Figure 1 but including certain elements not included in the latter figure.
Figure 2:
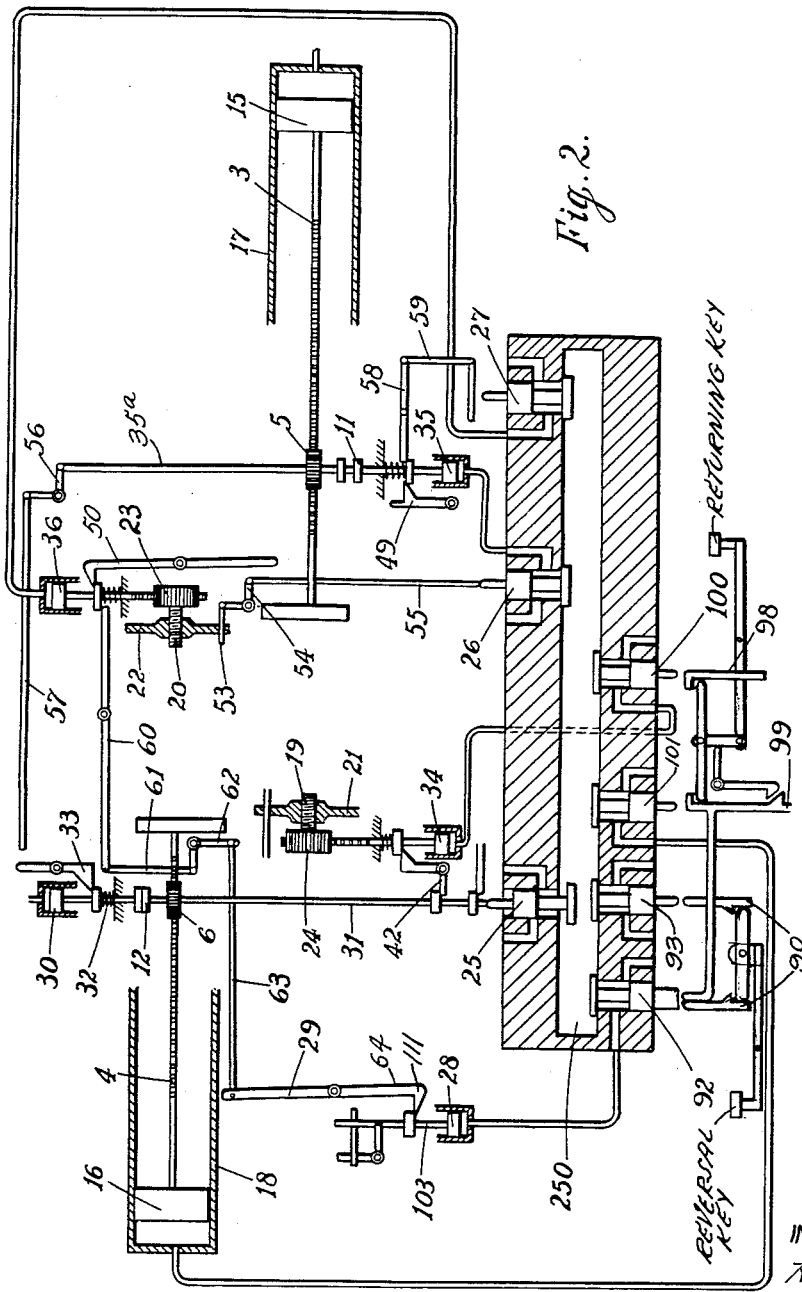
Figure 3:
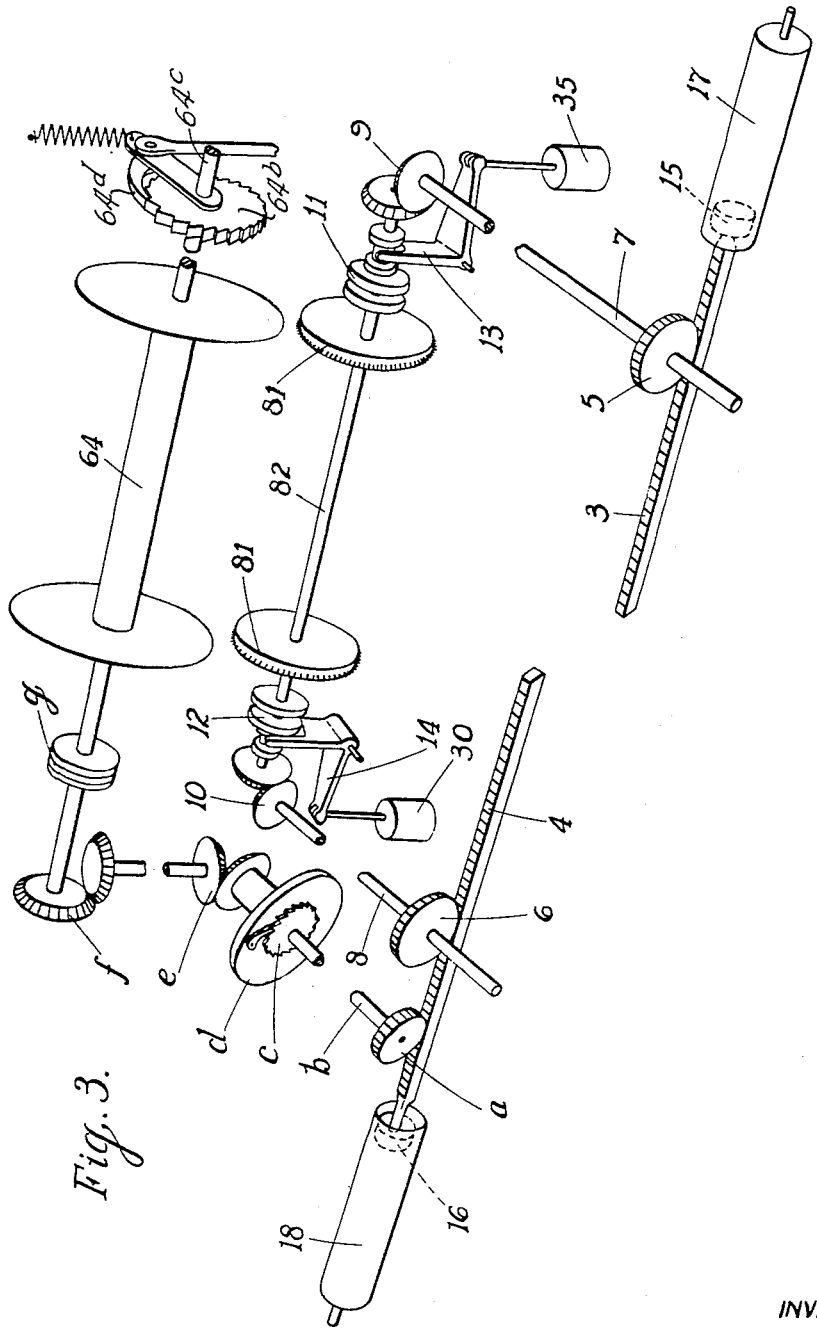
Figure 3 is a diagram showing the connections between the reversal displacement and replacement racks and the feeding and winding mechanism for the paper strip.

The general principles of operation of the mechanism will best be understood from a consideration of the diagrams of Figures 1, 2 and 3. The above mentioned two keys are shown, and the reversal displacement key is arranged to operate a slidable valve bar 90, Figure 1 (shown for convenience in the diagram as two separate bars) for simultaneously opening two valves 92 and 93, the former for controlling the paper strip feed and the latter for controlling rack 4. The replacement or returning key operates two valve bars 98 and 99 which actuate two valves 100 and 101, Figure 2, and also a valve 92. These valves are of known kind which, when actuated, admit pressure air from a common air chest to corresponding air pipes, and when a key is released the valves close. Two slidable rectilinear racks are provided, a reverse displacement rack 3 and a replacement rack 4 which are respectively meshed with two pinions 5 and 6. These pinions are connected by shafts 7 and 8, as seen in Figure 3, and bevel gearing 9 and 10 to the known main spur drive shaft 82 carrying the usual spur wheels 81. Engagement of the drive through the pinions 5 and 6 is effected by clutches 11 and 12 actuated by shift levers indicated for convenience on this diagram as 13 and 14, from two air pistons 35 and 30. The racks have operating air pistons 15 and 16 in cylinders 17 and 18 and are movable against stops 19 and 20. The stops are threaded and are rotatable in stationary nuts 21 and 22. The stop 20 is rotatable by a pinion 23 and the stop 19 is rotatable by a pinion 24. The air chest, indicated at 250, is provided with three further valves 25, 26 and 27. These valves are not directly key operated. Opening of the valve 92 by the reversal displacement key bar 90 admits compressed air to a piston 28 and raises a rod 103 to a latched position by means of a latch 29. The rod 103 is connected with the paper feed mechanism later described, and its actuation by the piston 28 releases the paper strip so that it is free to move. Opening of the valve 93 by the operation of the reversal displacement key bar 90 admits pressure air to a piston 30 connected to a rod 31 for engaging the pinion 6 with the main spur drive shaft 82, the piston being then held by a latch 33. The valve 101 controls the admission of air to the cylinder 18 of the replacement rack 4. The valve 100 controls the admission of air to a piston 34 which effects adjustment of the reverse displacement rack stop 19 through the pinion 24. The valve 25, Figure 1, controls the admission of air to the cylinder 17 of the reversal displacement rack 3. The valve 26, Figure 2, controls the admission of compressed air to a piston 35 for actuating the clutch 11 which connects the pinion 5 with the main spur drive shaft 82. The valve 27, Figure 2, controls the admission of air to a piston 36 for adjusting the stop 20 of the replacement rack 4. The piston 30 which is controlled by the valve 93 has a rod 31 capable of actuating the valve 25 and is also connected to a collar stop 145 adapted to operate a latch 42 to release the rack 43, spring loaded, which operates the reverse displacement rack stop 19 to set this one space away from the reversal displacement rack 3. The rod 31 is also connected through suitable linkage indicated in diagrammatic form only at 148, 150 to a latch 151 holding the valve bar 98 which is adapted to actuate the valve 101. This linkage can be seen in Figure 11 and in Figure 1. The release of the latch 151 allows the valve 101 to close under air chest pressure and so interrupts the supply of compressed air to the replacement rack cylinder 18 so that the replacement rack 4 is free to travel. The arrangement is such that this action takes place before the valve 25 has been opened to admit air to the reverse displacement cylinder 17 to actuate its rack. Upon the subsequent opening of the valve 25, the rack 3 is moved to its stop 19 and thereby returns the paper strip to a position one space ahead of the perforations corresponding to the start of the line. An element indicated for convenience in this diagram at 45 is engaged by the rack 3 when it reaches its stop and releases the latch 29 holding the piston 28 thereby restoring the paper feed mechanism to normal operation. The element 45 is also arranged to release a latch 49 which holds the clutch 11 controlling the pinion 5 of the reverse displacement rack 3 and also a latch 50 holding a rack 51 which actuates the adjustable stop 20 of the replacement rack 4. The arrangement is such that the pinion 5 is disconnected by the clutch 11 and the latch 50 releases the spring loaded rack 51 so that the stop 20 is set two steps away from the replacement rack 4. Thus by the operation of the reverse displacement key the paper strip is given the required reverse movement ready for the reception of the justification perforations in the spaces previously left blank before the start of the line perforations. Such justifying takes place in its known normal sequence, i. e. with the single justification first in the space to which reference has been made, followed by the double justifications in the space provided by the one step reversal of the paper strip which is concomitant with the .0075 justification operation as will be described hereinafter.

After the desired justification perforations have been made, the replacement key is operated and this opens the valves 92, 100 and 101 simultaneously. The valve 92 performs the same functions as before, namely to render the paper strip free in its feed mechanism. The opening of the valve 101 admits compressed air to the replacement rack cylinder 18 and moves the rack 4 to its previously set stop 20, which allows the said rack to move two steps or spaces beyond a travel corresponding to the length of the line perforations. The opening of the valve 100 admits compressed air to the piston 34 and thereby actuates the stop 19 of the reverse displacement rack 3 and returns this stop to zero position, this movement being performed against the air pressure on the piston 15. When the replacement rack 4 reaches its stop 20, it actuates elements which are indicated for convenience on the diagram at 53, 54 and 55 to open the valve 26, thereby admitting air to the piston 35 to actuate the clutch 11 controlling the operation of the pinion 5, the clutch being held in engaged position by the latch 49. This movement is also caused to release the latch 33 by linkage (indicated for convenience at 35a, 56, 77) so that the clutch 12 of the replacement rack pinion 6 is disengaged. A further linkage (indicated for convenience at 58, 59) opens the valve 27. The release of the latch 33 allows the valve 25 to close and cut off the supply of compressed air to the reversal displacement rack cylinder 17. The movement of the piston 35 controlled by the valve 26 also opens the valve 27 admitting air to the piston 36 which returns the replacement rack stop 20 to its zero position, this being effected against the air pressure on the rack piston 16. This movement also effects by suitable linkage (indicated for convenience at 60, 61, 62, 63) the actuation of the latch 29 holding the air piston 28 controlled by the valve 92, and thereby allows the paper feed mechanism to return to its normal position ready for the paper strip to receive perforations corresponding to a new line.

The two rack pinions 5 and 6 are therefore operatively connected to the main spur drive shaft 82 according to the position of paper travel as shown in the diagram of Figure 3 and the racks 3 and 4 are displaced in opposite directions by their pistons. As the ordinary keyboard setting proceeds, the reverse displacement rack 3 is displaced step by step towards the closed end of its cylinder 17. The paper strip leaving the spur wheels 81 of the main spur drive shaft 82 is led to a winder 64 as in the existing mechanism. When the replacement key is operated, air enters the cylinder 18 and drives forward the replacement rack 4. A further driving connection is provided between the pinion 6 or rack 4 and the winder 64. In the diagram this is illustrated for convenience as a pinion a, shaft b, one-way clutch c, d, gearing e, f, and friction clutch g. In the apparatus later to be described the arrangement is somewhat different, although the same in principle. The winder 64 operates in the usual manner during line setting and is driven by the above means for re-winding the paper strip at the start of a new line.

Figure 4:
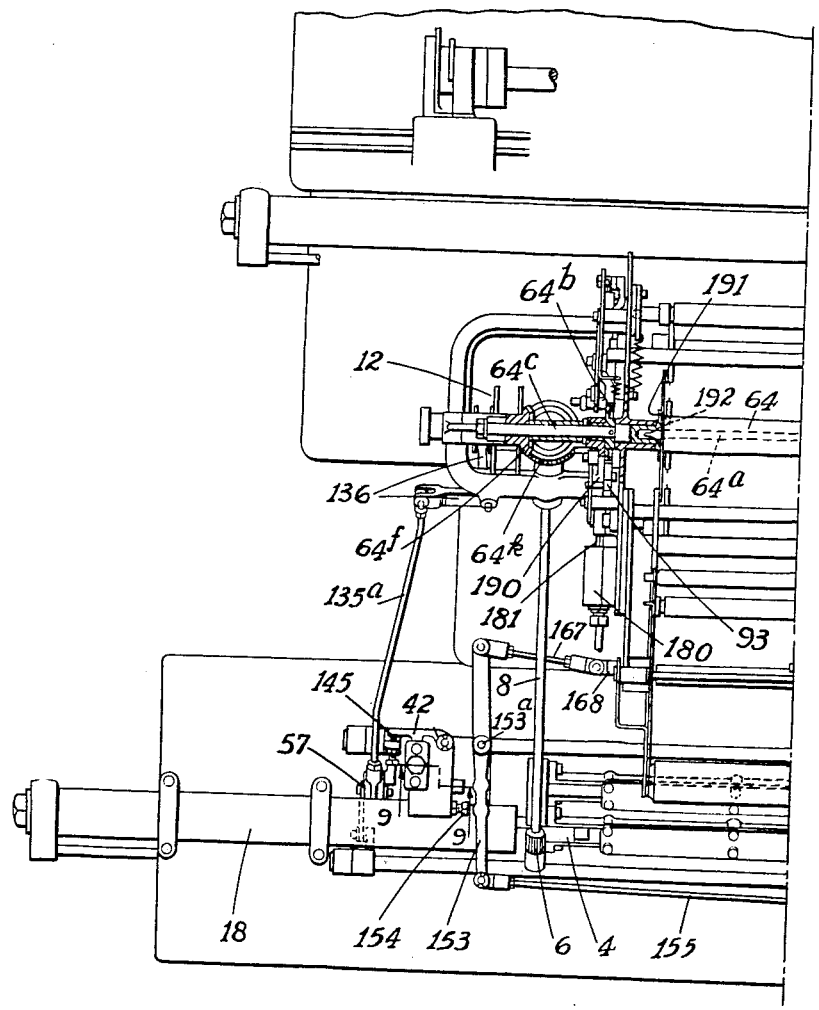

The apparatus now to be described embodies the principles outlined above and the main elements of the mechanism are given the same reference characters as in the diagrams of Figures 1, 2 and 3. The general arrangement of the mechanism is shown in Figures 4, 5 and 6 and the apparatus is associated with the key bank of the existing mechanism, the position of which is indicated at 71. An additional key bank to be described later is indicated at 72. The mechanism is supported upon a base 73 having side frames 74 and is generally constructed as in the existing mechanism. A spool of paper strip is placed in a paper guide 75 of the usual construction and is located in slots 76. The paper strip, indicated at 77, is fed over a tension rod 78 to spur wheels 79 on an auxiliary drive shaft 80, and thence to spur wheels 81 on the known main paper feed shaft 82. Perforation of the paper strip is effected at this position by the usual means. The paper strip passes to spur wheels 81 on shaft 82 and thence to the winder spool 64. The shafts 80 and 84 are driven by gear wheels 85 and 86 from a gear wheel 87 on the main paper feed shaft 82. A displaceable roller 88 is freely rotatable and is carried in a pair of guide slots 89 permitting downward displacement of the roller under gravity. The winder spool 64 has a removable spindle 64a (Figure 7) of the usual construction and is operated by a ratchet wheel 64b and a shaft 64c. The ratchet wheel 64b has a feed pawl 64d. The shaft 64c can also be driven from the replacement rack 4 through the bevel gears 64f and the shaft 64g as shown in Figure 7. A bevel gear 64h on the shaft 64g meshes with a bevel gear 64j also meshing with a bevel gear 64k (see Figure 4) which can be operatively connected with the replacement rack 4 by the pinion 6. A sliding clutch plate 64l secured to a shaft 64m can be engaged with a second clutch plate 64n secured to a sleeve 64o to which is attached the previously mentioned bevel gear 64j. This drive is the equivalent of the elements a, b, c, d, e and f referred to in connection with Figure 3. A spring loaded roller 64p (see Figure 6a) is arranged to engage the paper on the spur wheels 83 and provides a light brake to prevent over-running of the paper strip.

Figure 8:
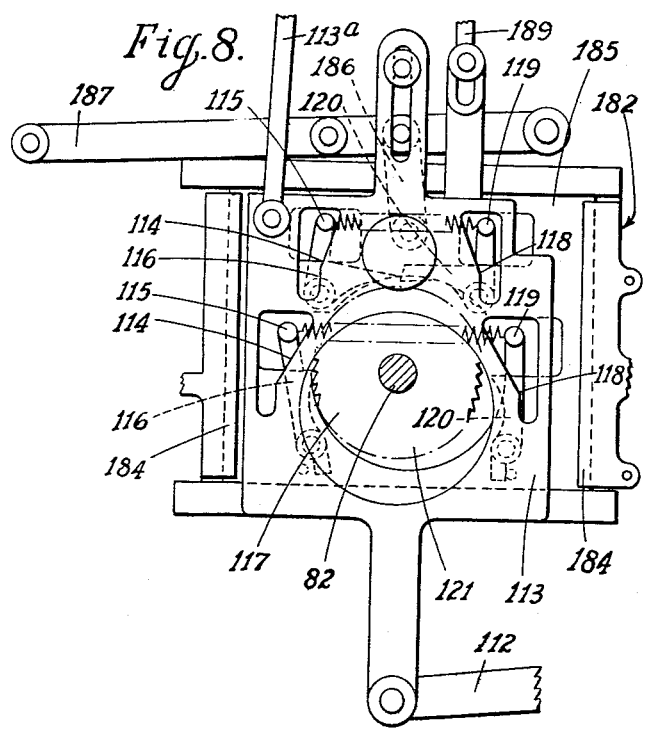
Figure 8 is a view taken on the line 8—8 of Figure 7.
Figure 19:
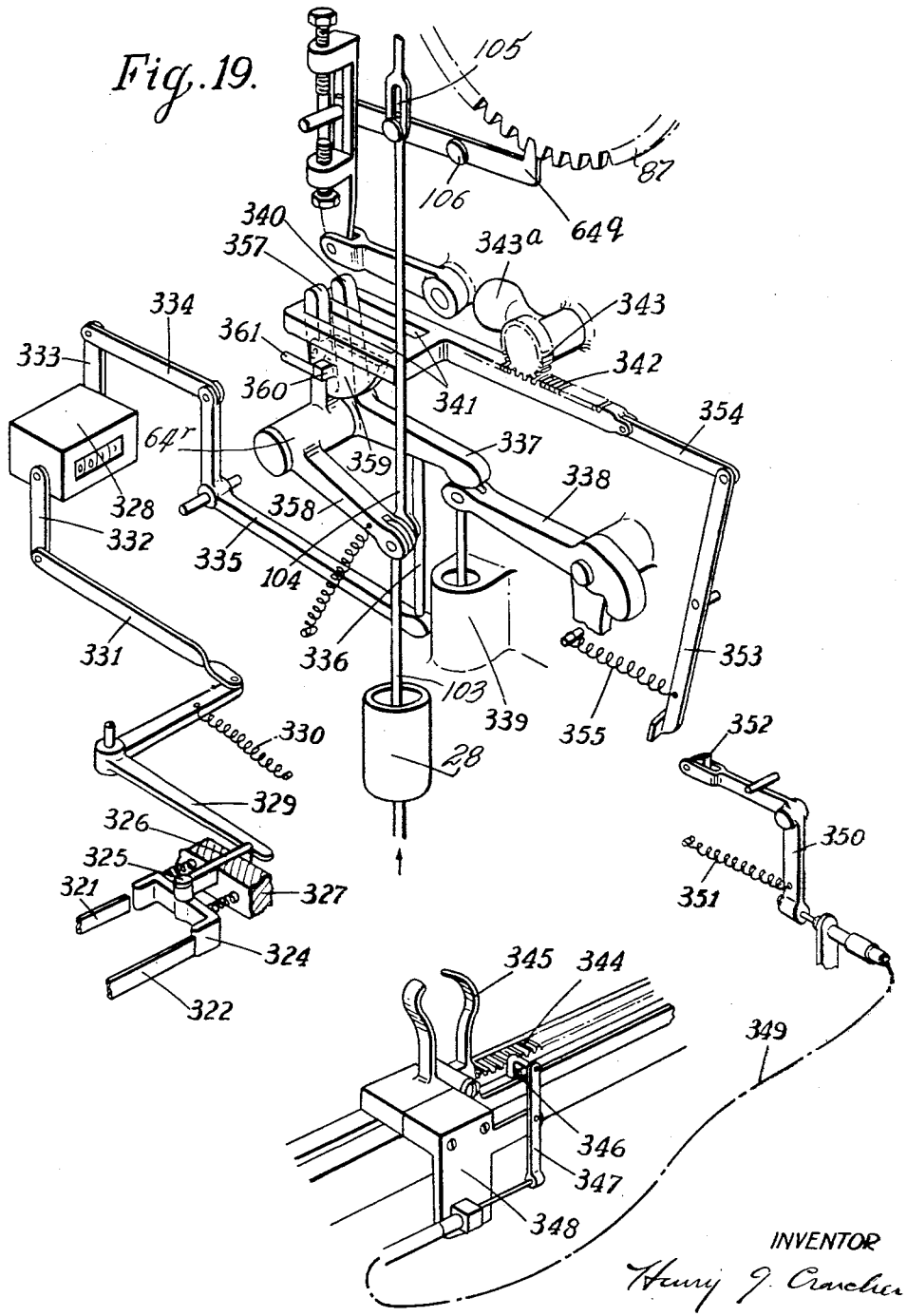
Figure 19 is a perspective view, more or less diagrammatic, of the mechanism for controlling the operation of the line counter and for locking the apparatus automatically.

Step by step winding of the strip is effected in the usual manner by ratchet mechanism to be described later and the gear 87 on the main paper feed shaft 82 is engaged by a dog tooth device 64q (see Figure 19). A three armed lever 64r (see Figure 6) is connected for operation from the air piston 28 (controlled by valve 92) by a link 103. A link 104 also connected to the lever 64r has a pin and slot connection 105 with the dog tooth device 64q, the latter being pivoted at 106. The lever 64r is connected by a pin 107 (see Figure 6) to a slotted link 108 which is connected at its upper end to a lever 109 secured to a shaft 110. A claw 111 on the lever 64r can be engaged by the latch 29 below it, see also Figure 14. The shaft 110 has attached to it a lever 112 shown in Figure 5 which is connected to a vertically slidable release plate 113 for the ratchet mechanism which drives the main paper feed shaft 82. This mechanism is shown in detail in Figures 7 and 8. The release plate 113 has two cam slots 114 which engage pins 115 attached to feed pawls 116 which normally engage a forward feed ratchet wheel 117 secured to the shaft 82. Two further cam slots 118 in the release plate 113 engage pins 119 attached to pawls 120 which in the position shown are withdrawn from a reverse feed ratchet wheel 121 also secured to the shaft 82. The release plate 113 is connected by a link 113a to a bell crank 122 (see Figure 5) actuating a release bar 123 which is slidable horizontally. Projections 124 and 125 on the bar 123 are arranged to engage pins 126 and 127 on the feed pawl 64d and retaining pawl 64e respectively of the ratchet wheel 64b on the shaft 64c of the known winding spool 64. Thus the normal forward feed of the main feed shaft 82 is accompanied by a feed of the winding spool 64 in the usual manner.

Figure 11:
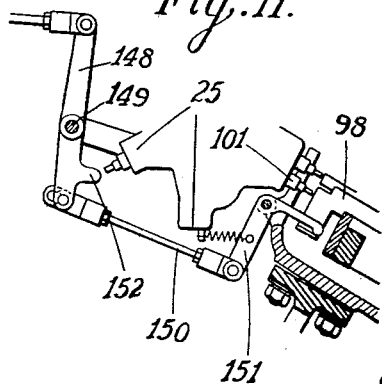
Figure 11 is an elevation, partly in section, of the valve operating mechanism at the end of the keyboard.

Referring to Figure 6, the three armed lever 64r has an arm 357 engaging a slot in a sliding rack 342 meshing with a pinion 343 on a spindle 130 and also operable by a handle 343a. This constitutes the known so-called punch bar lock, and displacement of the rack 342 to the left as viewed in Figure 6 locks the punch mechanism so that it cannot be operated from the keyboard. The air piston 30, which is actuated when the reverse displacement key is depressed, is connected by the rod 31 to a pivoted beam 131 which is rocked thereby until it abuts a stop 132. The beam 131 is secured to a shaft 133 carrying a control lever 134 as shown in Figure 5 which has a lateral projection 135 lying against the lever 57 which is freely mounted on the shaft 133. The lever 37 is connected by a rod 135 to a bell crank lever 136, also shown in Figure 4, which actuates the sliding clutch plate 64l of the clutch 12 as shown in Figure 7. The complementary clutch plate 64n is connected by the bevel gears 64j and 64k to the shaft 8 having its pinion 6 meshing with the replacement rack 4. The lever 57 also has an arm 137 loaded by a spring 138 and having a projection 139 which can be engaged by the spring loaded latch 33 which holds the clutch 12 in engaged position. The control lever 134 has a second arm 140 carrying an adjustable abutment 145 which is adapted to strike and displace the latch 42 which holds the stop 19 of the reverse displacement rack 3 in its zero position. This latch arrangement is shown in detail in Figures 9 and 10, and displacement of the latch 42 allows the stop 19 to return to a position one space away from the reversal displacement rack 3. The beam 131 also has an arm 146 connected by a link 147 to a lever 148 fulcrumed on a shaft 149. The lower end of the lever 148 is connected by a link 150 to a pivoted latch 151 as shown in Figure 11 which engages the valve bar 98 and thus holds the valve 101 open. A projection 152 on the lever 148 is adapted to actuate and open the valve 25 which admits air to the cylinder 17 of the reversal displacement rack 3 so that this rack will be driven back to its stop. This movement of the rack is transferred by the pinion 5, shaft 7, bevel gearing 9 and clutch 11 to the main paper feed shaft 82, which shaft is thereby rotated in an anti-clockwise direction (during the reverse displacement operation) to take the paper strip one step or space beyond the starting position for a line. As the replacement rack 4 is also engaged with the shaft 82 as previously described, the said rack will also be displaced away from its stop 20 by an amount which is exactly equal to the travel of the reversal displacement rack. The stop 19 for the reversal displacement rack 3 has associated with it a lever 153 pivoted at 153a which is engaged by the rack to cause it to strike against an adjustable abutment 154 as shown in Figure 4. A rod 155 connected to the lever 153 is connected to actuate a slidable trip plate 156 which is shown in detail in Figure 12. Pivoted to the trip plate 156 is a latch 157 engaged with the tail 158 of the latch 50 which holds the actuating mechanism for the stop 20 of the replacement rack shown in detail in Figure 13. By this means an actuation of the release plate 156 will cause the latch 157 to be displaced and allow the latch 50 to trip the stop 20 which then returns to a position two steps away from the replacement rack 4. The trip plate 156 also carries a pair of interengaging latches 158 and 159, the latter being engaged with one arm 160 of a bell crank lever as shown in Figure 5. The bell crank lever has a latch arm 161 which is engaged with a projection 162 on a lever 163 which is loaded by a spring 164. The lever 163 is connected by a rod 165 to a bell crank lever 166 for disengaging the clutch 11 on the paper feed shaft 82. The opposite end of the stop lever 153 shown in Figure 4 is connected by a rod 167 to a longitudinally slidable bar 168 upon the end of which is pivoted a pawl arm 169 loaded by a spring 170 as shown in Figures 14 and 15. The pawl arm 169 engages a series of pins 171 projecting from a rotatable cam plate 172 which is formed with a series of humps 173. Movement of the bar 168 to the right as effected by the mechanism previously described moves the cam plate 172 by one step so that the cam hump 173 depresses a roller 174 on an arm 175 of the pivoted latch 29 which is loaded by a spring 176. This movement removes the latch 29 from the claw 111 of the three armed lever 64r seen in Figure 6 and allows this lever, which is loaded by a spring 178, to resume its normal position as illustrated in Figure 6. This movement causes the dog tooth device 64q to be re-engaged with the gear wheel 87 on the paper feed shaft 82. The same movement of the three armed lever 64r allows the stop rack 342 meshing with the pinion 343 to return and thereby to free the punch mechanism. Since the three armed lever 64r is also connected to the pawl release plate 113 through the link 108, lever 109, shaft 110, and lever 112, the release plate is lowered and the feed and retaining pawls 116 are allowed to re-engage the ratchet wheel 117. At this stage the paper strip has been unwound to the measured extent, the unwound strip forming a loop under the gravity roller 88 which descends in its guide slots 89.

The paper strip is now in position for the justification operations usually carried out in the existing apparatus, but to maintain the usual sequence of key operations when justifying as in such existing apparatus it is necessary to provide for a reverse movement of the paper strip for the .0075 single justification key operation so as to position the paper strip ready for the subsequent double justification perforations. This is effected by a suitable valve bar arrangement in the key bank to be described hereinafter, whereby a valve is opened to admit air to a piston 180 shown in Figure 5. This valve bar being adjustably connected to the known .0075 single justification rock shaft, it follows that any movement of the latter for opening the .0075 valve also causes the valve 264 to open by movement of the valve bar 263 shown in Figure 18. The piston 180 is connected by a rod 181 to a feed frame 182 which is slidable horizontally and is loaded by springs 183. The feed frame has vertical guides 184 in which is slidable a feed plate 185 carrying the previously mentioned pawls 116 for imparting forward rotation to the ratchet wheel 117 shown in Figures 7 and 8. The feed plate 185 is connected by a link 186 to a rocking lever 187 to which is connected the main feed rod 188 which can, if desired, be operated by the usual mechanism on the known machine. The feed plate 185 is connected by a link 189 to the feed pawl lever 190 on which is mounted the pawl 64d which acts on the ratchet wheel 64b secured to the paper spool spindle 64c. A disc 191 secured to the said spindle has a projection 192 engageable with the removable paper spool 64 to drive the latter as shown in Figure 4. The feed pawl 64d is loaded by a spring 193 so that every time the pawl lever 190 is raised by the operation of the feed rod 188, the ratchet wheel 64b is advanced by the action of the spring 193 when the feed rod 188 returns to its initial position. This provides the usual paper feed and winding operation. When the previously described air piston 180 is actuated, the feed frame 182 is displaced to the left as viewed in Figure 5, so that the forward feed pawls 116 (see Figure 8) are disengaged from their ratchet wheel 117 and the reverse feed pawls 120 are engaged with the reverse feed ratchet wheel 121. The same movement causes a claw 194 on the feed frame 182 to be engaged with a latch 195 pivoted at 196 and loaded by a spring 197, thereby maintaining the feed frame 182 in its displaced position. The latch 195 can be disengaged by a projection 198 on a sliding link 199 attached to the lever 187 which is actuated by the feed rod 188.

After the required justification perforations have been effected with the mechanism in the above position, it is necessary to wind back the paper strip over the main feed spur wheel and also to operate the winder so that there is no slack in the strip, this operation being effected by the replacement rack 4. Operation of the replacement key actuates the valves 92, 100 and 101 as indicated in the diagram of Figure 1. The opening of the valve 92 causes actuation of the air piston 28 and the three armed lever 64r and dog tooth device 64q as shown in Figure 6, thereby releasing the paper feed mechanism as previously described so that the strip is ready for re-winding. The opening of the valve 100 admits air to the piston 34 shown in Figures 5 and 10. This piston is connected by a rod 200 to the rack 43 which meshes with the pinion 24 on the stop member 19. A threaded portion 201 on the member 19 is engaged in a threaded sleeve 202 secured in the body 203, and the rack 43 is loaded by a spring 204. Actuation of the aforesaid piston advances the stop member 19 to a position which will arrest the reversal displacement rack 3 in a zero position. A slot 205 is provided in the rack 43 and is engaged by the previously described latch 42 to maintain the stop in the said zero position. The opening of the valve 101 admits air to the cylinder 18 of the replacement rack 4 and displaces this rack to its stop 20, which has been previously set in a position such that the return travel of the paper strip is greater than its original withdrawal by three steps, thereby affording the required two blank spaces between the first and last perforations corresponding to the characters of consecutive lines, for the subsequent insertion of the two justification perforations, and the positioning of the third blank space ready for the perforation for the first character of the succeeding line. The gear 64j on the main feed shaft 82 meshes with the gear 64h on the shaft 64g as shown in Figure 7, the shaft 64g carrying a ratchet wheel 67. A free wheel plate 68 is loose on the shaft 64g and carries a pawl 206 loaded by a spring 207 and engaging the ratchet wheel 67. The free wheel plate 68 is attached to the bevel gear 64f which drives the paper spool spindle 64c. Thus when the replacement rack 4 is returned to its stop 20 the paper spool 64 is rotated to re-wind the slack in the paper strip. A pivoted arm 208 arranged to be engaged by the rack 4 is connected by a rod 209 to a lever 210 secured to a shaft 211 as shown in Figure 4. A second lever 212 on the said shaft 211, shown in Figure 6, is connected by a rod 213 to a lever 214 which actuates a valve 26 for admitting air to the cylinder 35 seen in Figure 6. The piston in the cylinder 35 is connected by a rod 214 to a beam 215 attached to a shaft 216 to which is also attached a control lever 217. A projection 218 on the said control lever is arranged to engage the previously described lever 163 (see Figure 5) which is connected by the rod 165 to the bell crank lever 166 for actuating the clutch 11. The clutch 11 has a sliding plate 219 as shown in Figure 7, the said plate carrying pins 220 and being keyed to the main paper feed shaft 82. The pins can enter holes in a plate 221 freely mounted on the shaft 82 and attached to a gear 9 meshing with a similar gear on the shaft 7 which is operatively connected to the rack 3 by means of the pinion 5. This operation thus engages the clutch 11 ready for the operator to proceed with the perforation of the paper strip for the next line. The shaft 216 (Figure 5) has attached to it a lever 222 connected by a rod 223 to the pivoted latch 33 which is loaded by a spring 224. With the above operation this latch is disengaged from the projection 139 on the arm 137, thereby disengaging the clutch 12 through the medium of arm 57, rod 135a, and bell crank lever 136. The beam 215 shown in Figure 6 has a depending arm 225 connected by a rod 226 to a lever operating the valve 27 of Figure 1. This valve opens to admit air to the piston 36 for actuating the rack 51 of the replacement rack stop member 20. This stop is shown in detail in Figure 13. The piston 36 is connected to the rack 51 by a rod 227 and the rack is loaded by a spring 228. Upward movement of the piston 36 rotates the stop member through its pinion 229. The stop member has a threaded portion 230 engaging a fixed threaded sleeve 231 so that the stop will thereby be advanced to the required extent. The rack 51 is provided with a slot (not shown in Figure 13) which is engaged by the pivoted latch 50 seen in Figure 4 to hold the rack in such position. The rack 51 also carries a pin 232 which engages an arm 233 on a shaft 234 also shown in Figure 14. An arm 235 attached to the shaft 234 carries a pivoted pawl arm 236 loaded by a spring 237, this pawl arm engaging the pins of the rotatable cam plate 172. The cam plate is thereby rotated one step and actuates the latch 29 shown in Figure 15 to release the claw 111 of the three armed lever 64r, the latter being connected through link 108, lever 109, shaft 110 and lever 112 to the release plate 113 shown in Figure 8. The release plate is thereby caused to descend so that the pawls 120 resume their normal position. At the same time the dog tooth device 64q is caused to re-engage the gear wheel 87 on the main paper feed shaft.

The operations outlined above return the mechanism to a position ready for the operator to commence the perforations for the next line, but the feed frame 182 is still latched in the reverse feed position by the latch 195 as shown in Figure 5. When the operator depresses the first key for the required character, the feed lever 187 connected to the feed rod 188 is caused to descend so that the trip projection 198 releases the latch and permits the reverse feed frame 182 to return to its normal position under the action of the springs 183, and is thus ready for the upward feed stroke of the feed rod 188 which occurs when the key is released.

When the present invention is employed in conjunction with the apparatus for make-up and correction described in the British patent application No. 13,961 of 1950, William Clowes & Sons Ltd., and Henry George Croucher previously referred to, additional keys are provided for controlling the desired sequences of operations. For this purpose the additional keys are arranged to effect the required combination of perforations for air tower control without the necessity of depressing combinations of keys in the existing key bank. Each additional key is arranged to actuate a lug on a key bar which falls back by gravity when the key is released. The key bar has the required number of lugs on its under side engaging rock shafts which are coupled, in any convenient manner, to the required rock shafts in the existing key bank. Thus by the depression of one key in the additional key bank, the required combination of perforations is obtained by actuation of existing valve bars of the existing key banks.

The previously described reversal displacement and replacement keys, and further keys for other purposes referred to hereinafter, are accommodated in an additional key bank which is shown in Figures 16, 17, 18 and 29. The existing or known key blank is indicated generally at 71 and the additional key bank 72 is fitted to the left hand side of the existing key bank, as shown. The additional key bank contains four columns of keys indicated generally at 238. These keys are arranged to operate bars in the usual and known manner, the key bars actuating rock shafts and the rock shafts operating valve bars which in turn open the air valves. According to the invention, use is also made of valve bars to operate rock shafts which in turn operate other selected key bars controlling yet further rock shafts.

Thus the key 238 shown in Figure 16, which may be regarded as typical, is rotatable on a shaft 239 to engage a lug 240 on a longitudinal slidable key bar 241. A depending lug 242 on the bar 241 engages the upper cross member 243 of a rock shaft 244. A lower cross member 245 of the said rock shaft engages and operates a lug 246 on the longitudinal slidable valve bar 247 which is arranged to actuate a piston 248 to raise the valve 249. The valve bar is returned after operating by gravity. This arrangement is similar to known key board mechanism. Raising of the valve 249 allows air to flow from the valve chest 250 through a passage 251 and pipe 252 to the appropriate operating piston. The arrangement of the valve bars and rock shafts is shown in Figure 18, the keys and key bars being omitted. The key bar lugs relative to each valve bar and further details of the key bars are described later and shown in Figure 29. The valves are accommodated in a casing indicated generally at 253. The following description refers to the rock shafts, valve bars and valves shown in Figures 18 and 29.

The reversal displacement key is arranged to actuate a key bar for operating the rock shaft 255 which engages the valve bar lug 90a to operate the valve bar 90. As shown, this valve bar is formed at its end to actuate the valves 92 and 93 as described in connection with Figure 1, the valves admitting air to the pistons 28 and 30.

The replacement key is arranged to operate a key bar to actuate a rock shaft 257, this latter being engaged with two valve bar lugs 98a, 99a on valve bars 98 and 99. As shown in Figure 18 these bars are adapted to open the valves 100, 101 and 102 as previously described.

Measure change keys are provided which will be referred to as 2, 3, 4 and 5 keys. A measure change 2 key is arranged to actuate a rock shaft 283 causing the valve bar 284 to open the valve 286 which provides an air supply for the means of varying the line measure, to be described later. A measure change 3 key actuates a rock shaft 288 which causes a valve bar 289 to open a valve 291 which provides an air supply for the said line measure varying means. A measure change 4 key actuates a rock shaft 293 to displace a valve bar 294 which opens a valve 296 for the same purpose. A measure change 5 key displaces a rock shaft 298 which displaces a valve bar 299 thus opening a valve 301 for the same purpose as above.

As is shown in Figure 29b, the measure change valve bars 299, 294, 289 and 284 each carry a further member capable of being manually moved to an operative position from an inoperative position, as when the valve bars are used for measure changing purposes only. These members 284s, 289s, 294s, and 299s cause engagement of rock shafts 284r, 289r, 294r, or 299r, respectively, when the corresponding valve bars are actuated. Normally the said members are retained by gravity in a resting position against stop pins indicated generally at 299p. When the shaft 299r is engaged by the member 299s on the bar 299 the said rock shaft is actuated and thereby caused to engage a depending lug 267j on the key bar 267f, which in turn causes further depending lugs 267g, 267h, and 267i on the said bar to actuate rock shafts 300, 277, and 271 to produce the known perforations "G," "M," and ".0005." The bar 267f and also bars 267, 259 and 260 are referred to as sizing bars 5, 4, 3, and 2 and are referred to hereinafter. It will be appreciated that when the sizing bars are used for normal purposes and not in combination with the measure change valve bars, their depending lugs 260d, 259d, 267d, and 267j are merely displaced away from their respective rock shafts resting against their pins. The use of rock shafts in this manner constitutes an improvement in the usage of this form of mechanism. The rock shafts 294r, 289r, and 284r operate in exactly the same manner as the rock shaft 299r described above, causing lugs 267d, 259d, and 260d to operate the key bars 267, 259, and 260, respectively.

A measure replacement key is provided for the purpose of returning the means for varying line measure (to be described later) to its normal position. This key is arranged to actuate a key bar for operating a rock shaft 303. This latter displaces a valve bar 304 to open a valve 305 which admits air to an appropriate piston on the line measure varying means.

A reverse setting key effects the setting back of the paper strip by one step when required. The reverse setting key is arranged to actuate a key bar which engages a lug 263a on a valve bar 263 for operating a rock shaft 261 and opening a valve 264 which valve admits air to the piston 180, see Figure 5, for controlling the reversal of the paper feed as described. The valve bar 263 also carries a lug 263b (see Figure 29) which engages a rock shaft 266 which is coupled to the rock shaft 266a of the known machine, and said valve bar carries a further lug 263c which engages a rock shaft 265 which is coupled to the rock shaft 265a of the existing machine. When the rock shafts 265a and 266a are actuated by key bars on the known machine, a paper feed movement is obtained but no perforation of the strip is effected. The reason for this is that the rock shaft 265a causes the known "0" punch bar to lift which has no punch and the rock shaft 266a causes the known "15" punch bar to lift which also has no punch. This arrangement is provided for the purpose of obtaining a zero position for the mechanism and is well known. A cancellation key is provided for the purpose of producing a .0005 perforation in the paper strip and thereby preventing the casting of a line when the mechanism is employed with the known single type casting machine. This key is arranged to actuate a key bar for operating a rock shaft 268 thereby engaging a valve bar lug 270a on a valve bar 270. The valve bar 270 also carries further lugs 270b and 270c for causing movement of rock shafts 266 and 271 respectively, these being connected to the rock shafts 266a and 271a of the known machine, and perform normally the function of effecting the .0005 perforation in the strip and feeding the strip forward one step. This cancellation key provides an alternative to the use of one of the lower justification keys in the known manner on the existing machine, but when used with the present invention a further mode of use is afforded. The cancellation valve bar 270 also carries a further bar 272 having a lug 272a which is movable to either an operative or inoperative position. In the operative position of the bar it can actuate the rock shaft 261 and will afford the desired perforations, and also cause a one step reversal movement of the paper strip when used with the reversed justification as previously described, in order that a double cancel sequence movement can be produced as desired in the two blank spaces left in the strip after the reversal displacement, if justification is not required. Two further valve bars are included for use with mechanism to be later described with reference to Figures 25, 26, and 28. A valve bar 308 is provided to actuate a valve 310 which controls an air supply to the justification scale indicator for lifting the rack thereof to be later described, and the valve 310 is linked to the so-called "S" rock shaft 281a of the known key board so that when this is operated in a known manner it carries forward the rock shaft 281 because of its coupling means, and by so doing causes the lug 308a on the valve bar 308 to take the bar along also, so obtaining an "S" air supply for the mechanism above mentioned. A valve bar 306 is provided to actuate a valve 307 to obtain a neutralising air supply for release of the said rack of the justification scale indicator to be later described, the valve bar 306 being connected to the normal restoring key by mechanical linkage, and not through rock shafts, as will be described.

Two further valve bars are included for use with the counting mechanism, to be later described. Two valve bars 321 and 322 engage the ends of a lever 324 centrally pivoted at 325 on a bar 326. They are operated by rock shafts 271 and 323 engaging lugs 321a and 322a on bars 321 and 322 respectively. The rock shafts 271 and 323 are connected to the .0005 and .0075 rock shafts of the known machine by couplings 271a and 323a such rock shafts when operated producing the perforations related to the upper and lower rows of justification keys in the known keyboard. For the purposes of obtaining a one step paper reverse feed following the perforation of the .0075 single justification, for purposes later described, a further bar is included providing an alternative means of obtaining this result. This bar 114 has a lug 114a which engages the reverse setting rock shaft 261 when the bar 114 is moved forwards, which happens when the lug 114b carried on a selectively positionable member 114c is thrust by drive contact from the rock shaft 323 which is coupled at 323a to the .0075 rock shaft of the known keyboard. Hence every time the normal .0075 rock shaft oscillates so also the bar 114 is actuated to engage the rock shaft 261 in its travel and thereby open the valve 264. When not required, the member 114c can be positioned in such a manner that the rock shaft 323 freely passes over the lug 114b without engagement. In order to complete an understanding of these valve bars with their rock shaft control a brief examination of the key bars and lugs thereon causing selective movement of these rock shafts will be given. The key bars shown in Figure 29 are normally thrust forwards in a known manner as is shown in Figure 16. Each of the key bars shown has its own control key and carries upper lugs relative to the position of the key in the four rows of the key bank, as shown in Figure 17, whilst the lower lugs are only of sufficient projection to strike the upper cross member of the rock shafts shown, as described relative to Figure 16.

The key bank includes keys for various purposes which will be clearly understood from their designations, these keys being used in conjunction with the arrangements described in British patent applications Nos. 13,961, 14,748, 18,120 and 19,325 of 1950, all in the names of William Clowes & Sons Ltd. and Henry George Croucher. They operate in any of the following ways, depending on their function for (1) opening valves only, (2) producing perforations only, (3) combining (1) and (2). It is convenient to examine them relative to these groups.

(1) As valve operating means whereby air supplies may be obtained to actuate pistons, such pistons not being used for the effecting of perforations, such keys are reversal displacement, replacement, measure change and measure replacement keys, these being used for the purpose of the invention.

The reversal displacement key is arranged to operate a key bar 254 having a lug 254a for operating a rock shaft 255.

The replacement key operates a key bar 256 having lug 256a to actuate a rock shaft 257 which latter operates two valve bars 98 and 99 to open the valves 100, 101 and 102.

The measure change 2 key operates a key bar 286 having a lug 286b to actuate a rock shaft 283.

The measure change 3 key operates a key bar 292 having a lug 292b to actuate a rock shaft 288.

The measure change 4 key operates a key bar 273 having a lug 273b to actuate a rock shaft 293.

The measure change 5 key operates a key bar 297 having a lug 297b to actuate a rock shaft 298.

The measure replacement key operates a key bar 302 having a lug 302a to actuate a rock shaft 303.

The above-mentioned keys operate rock shafts which open valves, none of which have any operative connection with the known keyboard. The following keys function as group (2) for perforating means using the rock shafts of the existing valve banks, and therefore the valve bars and valves of the existing known machine, by means of key bars each having the required number of lugs on its underside engaging rock shafts in the additional key bank which are coupled in any convenient manner to the required rock shafts in the existing key bank. Such keys are the tower change, tower deletion, leading, leading deletion, solid matter, repeat leading matter and stop keys. These are used when the present invention is employed in conjunction with the apparatus for make-up and correcting, as described in British patent application No. 13,961 of 1950 in the names of William Clowes & Sons Ltd. and Henry George Croucher. For this purpose the additional keys are arranged to effect the required combination of perforations for air tower control without the necessity of simultaneously depressing a combination of keys in the existing banks. The following description illustrates the general mode of operation of these keys.

A tower change 2 key is arranged to actuate a key bar 309 having lugs 309c and 309d for operating the rock shafts 271 and 285 which are coupled to the so-called ".0005" and "D" rock shafts on the existing keyboard to afford the desired combination of perforations.

A tower change 3 key actuates a key bar 287 having lugs 287c and 287d for operating the rock shafts 271 and 290 which are coupled to the ".0005" and the "E" rock shafts of the known machine to produce the corresponding perforations.

A tower change 4 key actuates a key bar 292 having lugs 292c and 292d for operating the rock shafts 271 and 295 so causing ".0005" and "F" perforations. A tower change 5 key actuates a key bar 297 having lugs 297c and 297d for operating the rock shafts 271 and 300 to produce the ".0005" and "G" perforations.

A stop key is also provided and is arranged to actuate a key bar 258 having lugs 258c and 258d for actuating the rock shafts 271 and 277, these latter being coupled to the ".0005" and "M" (271a and 277a) rock shafts in the known keyboard so that the desired combination of perforations for the above purpose is obtained.

There is also a lead key for use in conjunction with apparatus as described in the British patent application No. 13,961 of 1950 in the names of William Clowes & Sons Ltd. and Henry George Croucher, and British Patents Nos. 8,633 of 1899 and 17,199 of 1908 (duplicate of U. S. Patent No. 994,405) referred to above. This key is arranged to actuate a key bar 278 having lugs 278c, 278d and 278e arranged to actuate rock shafts 271, 281 and 282 which are coupled to the so-called ".0005," "S" and "H" rock shafts 271a, 281a and 282a of the known keyboard to afford the required combination of perforations.

A lead delete key is provided to operate a key bar 274 having lugs 274c, 274d and 274e arranged to actuate the rock shafts 271, 282 and 277 respectively, thus producing the perforations "H," "M" and ".0005."

A tower 2 delete key is provided to operate a key bar 270f having lugs 270g, 270h and 270i for actuating the rock shafts 285, 282 and 271 respectively, thus producing the perforations "D," "H" and ".0005."

A tower 3 delete key is provided to operate a key bar 276 having lugs 276a, 276b and 276c for actuating the rock shafts 290, 282 and 271 respectively, thus producing the perforations "E," "H" and ".0005."

A tower 4 delete key is provided to operate a key bar 280 having lugs 280a, 280b and 280c to actuate the rock shafts 295, 282 and 271 respectively, giving the perforations "F," "H" and ".0005."

A tower 5 delete key is provided to operate a key bar 262 having lugs 262a, 262b and 262c to actuate the rock shafts 300, 282 and 271 respectively, giving the perforations "G," "A" and ".0005."

A "solid matter" key is provided to operate the key bar 279 having lugs 279c, 279d and 279e to actuate the rock shafts 290, 300 and 271 respectively, giving the perforations "E," "G" and ".0005."

A "repeat leading" key is provided to actuate the key bar 275 having lugs 275c, 275d and 275e to actuate the rock shafts 290, 295 and 271 respectively, thus producing the perforations "E," "F" and ".0005."

Further keys are provided to function as group (3) referred to previously. These are used for controlling apparatus described in British patent applications Nos. 13,961, 14,748, 18,120, 19,325 of 1950, all in the names of William Clowes & Sons Ltd. and Henry George Croucher, relative to character width adjustment, photographic reproduction and mould adjustment, as well as having alternative uses relative to the present invention.

The sizing keys previously referred to are employed for the control of the above-mentioned apparatus through the medium of the mechanism referred to as "panel A" and described in the specification of British patent application No. 13,961 of 1950 in the names of William Clowes & Sons Ltd. and Henry George Croucher. These keys are employed by the operator when producing a perforated record strip for controlling the operations of casting type for example on the existing machine, or for producing typographical characters according to British patent application No. 6,848 of 1949 in the names of William Clowes & Sons Ltd. and Henry George Croucher, and the control perforations produced by these keys are so positioned on the record strip that they are met with on the existing type casting machine or other reproduction apparatus as referred to above, before the perforations corresponding to the related line of characters. This may be effected by the reversal and replacement of the record strip according to the present invention. Thus the adjustment of a controlling wedge determining character width, the adjustment of a mould body determining character depth, and the focussing in a photographic reproduction apparatus for example will be effected prior to the setting of the relative line of characters.

According to the invention the measure change keys which open valves for controlling the line measure varying mechanism described hereinafter can also be arranged to actuate the previously mentioned sizing key bars, operation of which effects perforations in the paper strip for the appropriate control of the "panel A" mechanism for adjusting the character width, character depth or focussing of photographic reproduction means as previously mentioned. This is effected by having adjustably positioned lugs on the measure change valve bars 284, 289, 294 and 299 which can be set to engage the sizing bars. Thus by depressing a single key the operations of setting the line measure and selecting the line justifying drum are performed, and also controlling perforations are effected in the record strip which, through the "panel A" mechanism, can result in the same operations in a known composing machine.

Thus the sizing 2 key actuates a key bar 260 which carries lugs 260a, 260b and 260c which engage the rock shafts 285, 277 and 271 of the key bank 72 which are coupled to the known rock shafts 285a, 277a and 271a, so producing the perforations "M," "D" and ".0005."

The sizing 3 key bar 259 carries lugs 259a, 259b and 259c which engage the rock shafts 290, 277 and 271, thus producing the perforations "M," "E" and ".0005."

The sizing 4 key bar 267 carries lugs 267a, 267b and 267c which engage the rock shafts 295, 277 and 271, thus producing the perforations "M," "F" and ".0005."

The sizing 5 key bar 267f carries lugs 267g, 267h, 267i which engage the rock shafts 300, 277 and 271, thus producing the perforations "M," "G" and ".0005."

It will also be seen that these four key bars 260, 259, 267 and 267f carry depending lugs the thrust faces of which are directed oppositely to the lugs previously described, and are shown at 260d, 259d, 267d and 267j. When any of these lugs are thrust by the rock shafts 284r, 289r, 294r or 299r respectively which have a unique function in that they are not always directly actuated by a valve bar, as previously described, then the key bar carrying the lug actuated by the rock shaft is moved forwards and simultaneously actuates other rock shafts. These rock shafts are only used when the operator is using the measure change key for line measure variation as well as producing perforations for control of the "panel A" mechanism referred to previously. Such movement takes place by the adjustable positioning of the movable members 284s, 289s, 294s and 299s situated on measure change valve bars 284, 289, 294 and 299 respectively, in the manner and for the purpose already described.

A valve bar 306 is provided to actuate a valve 307 which controls an air supply to the justification scale indicator to be later described, the valve bar 306 being suitably connected to the normal restoring bar. A valve bar 308 is linked to the so-called "S" rock shaft 281a of the normal keyboard so that when operated it carries forward the rock shaft 281 when a space key is depressed. A lug 309 on the bar 308 is arranged so that it can be engaged when required by the rock shaft 281 to advance said bar and thereby open a valve 310 which controls the step by step rise of the justification indicator. On the existing apparatus a restoring key is provided for actuating a key bar and valve bar, the valve operating the normal line reversing and restoring mechanism, this key being always operated after justification of a line. Means is provided whereby this restoring key can be used instead of the replacement key previously described. Referring to Figures 16 and 17, a valve bar 311 is actuated by the usual restoring key in the existing key bank. This bar has a pin 312 engaging a rocking lever 313 freely mounted on a shaft 314 and linked to a lever 315 secured to a shaft 316. Secured to said shaft is a second lever 317 linked to a lever 318 freely mounted on a shaft 319. The said lever engages a pin 320 on the valve bar 270, the arrangement being such that movement of the restoring key valve bar 311 is transferred to the valve bar 270, thereby actuating the rock shaft 257, the valve bars 98 and 99, and thus opening the valves 100, 101 and 102 as previously described.

In the existing and known apparatus a counter is provided for line counting and is actuated on each depression of the restoring key. When the said key is depressed, compressed air is admitted to a piston which actuates a bell crank and so operates the counter arm. To prevent undesired operation of the counter, i. e. other than at the completion of correct lines, means is provided to obstruct operation of the said piston, and such means may be actuated by an additional key which is depressed by the operator whenever the cancellation key is operated or whenever a .0005 single justification key is depressed and is not followed by a double justification key operation. Alternatively the desired result can be achieved by arranging the counter so that it is operated only when a correct line is completed, i. e. upon the effecting of the usual double justification operation. According to one mode, air from the existing .0075 and .0005 air pipes is utilised to create a mechanical movement for actuating the counter arm. Another mode is illustrated in Figures 18 and 19. Two valve bars 321 and 322 in the additional key bank are connected by their lugs to the rock shafts 271 and 323 which are coupled with the rock shafts of the existing key bank which produce the single and double justification perforations. The valve bars 321 and 322 engage the respective ends of a lever 324 centrally pivoted at 325 on a bar 326 slidable in a guide 327 and connected to a counter 328 by a bell crank 329 loaded by a spring 330, a link 331 and a counter arm 332. With this arrangement, actuation of either valve bar alone has no effect on the counter, but when both are actuated together the counter is operated one digit. The counter is also of a well known kind which is provided with an arm 333 which is moved when a predetermined number has been counted. The arm 333 is connected by a link 334 to a bell crank 335 carrying a rod 336 which engages a crank 337 resting on the known reverse valve crank 338 of the existing apparatus such as is described in the British Patent No. 17,199 of 1908. The reverse valve crank is shown in Figure 18 of said specification where the piston actuating said arm is shown at 5x. The raising of the rod 336 causes locking of the mechanism in a known manner. In the existing apparatus, the mechanism is restored to the required position for starting a new line by means of the restoring key which causes the known em rack or line measuring rack to be driven against a stop by its pinion. If this movement is not completed, owing to the operator releasing his key too soon, the next line is incorrectly set. To prevent this, means is provided to lock the apparatus if the em rack does not reach its stop, or if it recoils away. In accordance with the invention, the existing crank 338 which is operated from a piston in the cylinder 339 when the reversing key is depressed has one arm 337 of a bell crank lever resting upon it as previously described. Another arm 340 of said bell crank is engaged in a slot 341 in the sliding rack 342 meshing with the pinion 343 of the existing punch bar lock, a semi-rotation of which locks the known tension arm bar. When so locked, the pistons actuating the perforation punches cannot be operated as is well understood. Unlocking is effected when the em rack 344 reaches its stop 345. A pin 346 on the rack 344 engages a lever 347 pivoted on a plate 348 attached to the stop 345. The lever 347 is connected by a cable transmission 349 to a pivoted latch lever 350 loaded by a spring 351 and having a latch 352 engageable with a pivoted lever 353 connected by a link 354 to the rack 342. When the latch 352 is released the lever 353 is moved by a spring 355 to displace the rack 354 and release the punch lock. It will be seen that this mechanism may be employed independently of the previously described mechanisms.

Within the slot 341 of the rack 342 is engaged the arm 357 of the three armed lever 64r which is connected to the locking rod 104 which as previously described is lifted when the reversal displacement or replacement keys are depressed. Lifting of the rod 104 thus actuates the lever arm 358, and thereby actuates the punch lock. Unlocking is effected upon downward movement of the rod 104 by the following mechanism. A plate 359 pivoted to the crank arm 357 has a projection 360 engaging a stop 361 and is swung upwardly when the crank is moved for locking and is thereby caused to occupy the slot 341. In this manner the return movement of the crank is enabled to actuate the rack 342 to unlocking position. The arrangement is such that the following modes of operation are possible, (1) locking by counter and unlocking by hand, (2) locking by operation of existing reversing valve crank and unlocking by em rack, (3) locking and unlocking by operation of the reverse displacement and replacement keys and (4) existing manual locking and unlocking. The above mechanism for actuating the punch lock has been described mainly with reference to the diagram of Figure 19 for greater clearness, but the same mechanism, with the elements slightly differently arranged, is shown in Figures 6, 20 and 21 and operates in the same manner.

Means is provided for preventing the operator from continuing to set on the keyboard when the paper supply spool has become exhausted. Referring to Figure 6, a roller 362 which bears on the paper strip is carried by a lever 363 pivoted at 364 and loaded by a spring 365. The opposite end of the lever 363 is connected by a rod 366 to a stop bar 367 as shown in Figures 21 and 22 which is slidable vertically and carries a stop 368 which, when the bar 367 is raised, is adapted to strike the latch 369 pivoted at 370 and loaded by a spring 371. A toe 372 on the latch is thereby removed from a recess 373 in a slidable locking bolt 374 loaded by a spring 375. The locking bolt 374 is thereby displaced against the stop rack 342 which latter has a recess 376. When the stop rack is subsequently moved to locking position, the bolt 374 enters the recess 376 and thereby prevents release of the rack. Release of the stop rack from locked position can be effected by pressing down the stop bar 367 manually by means of a handle 377. An inclined surface 378 on the stop bar is arranged to engage a pin 379 on the locking bolt 374 and withdraw it from the recess 376, the bolt being held clear by the vertical surface 380 on the stop bar 367. Such releasing operation will be necessary if the apparatus should be locked, by exhaustion of the paper supply, after a single justification operation has been performed, in order to enable the double justification perforations to be made. Similarly, the stop rack must be released when it is desired to place a new roll of paper in the machine.

In the existing apparatus the operation of the paper strip feeding and winding mechanisms is controlled by a cam plate attached to the end of the known tension arm and oscillating vertically with it. The cam plate causes a lever to swing to one or other of a pair of stop blocks and actuates a valve for controlling the admission of compressed air alternately to a pair of pistons connected to a lever which actuates the feed mechanism. This arrangement is part of the existing apparatus as previously defined and therefore need not be further described. The piston cylinders of the existing machine are shown at 381 and 382 in Figure 23. According to the present invention, an additional plate 383 is provided with additional ports 384, 385 for the admission of air to two additional piston cylinders 386, 387, the pistons of which are connected to an additional lever 388 which is cross connected to the existing lever 389. These additional pistons are also shown in Figure 5. By this means the power available to operate the feed rod 188 is doubled in a simple and convenient manner and the mechanism can be operated with a lighter and faster touch on the keyboard without disturbing the timing of the various parts. This feature of the invention can be applied to existing apparatus independently of other features described herein if desired.

It will be convenient at this stage to consider briefly the sequences of operations involved in the reversal displacement and replacement cycles as performed by the mechanism previously described. In setting the last character of a line by depression of the appropriate key, release of the key causes the paper strip to advance one step. The reversal displacement key is then depressed which causes the paper strip to be unwound to bring the blank area preceding the line which has just been set into position to receive perforations. This involves the opening of the valve 92 (Figure 18) admitting air to the cylinder 28 (Figure 6) which releases the dog tooth device 64q, moves the stop rack to punch locking position, moves the release plate 113 to remove the pawls 116 from the ratchet wheel 117 (Figure 8), and moves the slide bar 123 to remove the pawls 64d and 64e from the ratchet wheel 64b (Figure 5). At the same time the valve 93 is opened admitting air to the cylinder 35 (Figure 6) which effects engagement of the clutch 12 (Figure 4) and thereby connects the replacement rack 4 to the main paper feed shaft 82. The stop 19 of the reversal displacement rack 3 is returned to the one step ahead position. The valve 101 is closed so that the air is vented from the replacement rack cylinder 18. The valve 25 is opened and the reversal displacement rack 3 is moved to its stop 19. The displacement rack stop is released by engagement of the rack 3 with the arm 153 (Figure 4) and returns to a two steps ahead position. The clutch 11 is disengaged so that the reversal displacement rack 3 is disconnected from the main paper feed shaft 82. The air piston 28 controlling the paper feed mechanism is unlatched so that the pawls 116 are engaged with the forward feed ratchet wheel 117 (Figure 7) and the pawls 64d and 64e are engaged with the ratchet wheel 64b of the winder. The dog tooth device 64q is also engaged with the gear 87 and the stop rack 342 is returned to unlocking position. At this stage the depression of any .0075 single justification key on the existing keyboard, or any other key affording a .0075 perforation, will cause a reverse feed of the paper strip to the blank area which is adjacent the last character perforation of the previous line. The depression of any double justification keys or other keys affording a .0075 and a .0005 perforation will also cause a further reverse feed of the strip.

When the replacement key is depressed, no perforation is effected but the paper strip is rewound and the mechanism is re-set for a further line, leaving two blank areas between the last character perforation of the previous line and the first character perforation of the line which follows. The key operation opens the valve 92 which results in the release of the dog tooth device 64q, movement of the stop rack 342 to locking position, operation of the release plate 113 to remove the pawls 120 from the reverse feed ratchet wheel 121, and displacement of the sliding bar 123 (Figure 5) to remove the pawls 64d and 64e from the ratchet wheel 64b of the winder. The valve 100 is opened to actuate the piston 34 and move the stop 19 of the reversal displacement rack 3 to zero position. The valve 101 is opened which causes the return of the replacement rack to its stop 20 which is set in advanced position. The valve 26 is opened by the return of the replacement rack which causes engagement of the clutch 11 to connect the reversal displacement rack with the main paper feed shaft 82. The valve 27 is also opened which causes the stop 20 of the replacement rack 4 to be moved to zero position. This also causes the unlatching of the paper feed control piston 28 which engages the pawls 116 with the forward feed ratchet wheel 117 and also disengages the pawls 120 from the reverse feed ratchet wheel 121. The dog tooth device 64q is engaged with the main paper feed gear 87 and the stop rack 342 is returned to unlocking position.

The different positions occupied by the paper strip during the reversal displacement and replacement operations are shown in Figure 24. The perforating punches act along the datum 390 and the paper strip is shown at A in position following the release of the key which effects the last character perforation 391 of a line, the first character perforation of which is at 392. The strip performs its normal movement vertically in the figure as shown by the arrow so that the perforation 391 moves one step ahead of the punch datum when the corresponding key is released. The last character perforation of the preceding line is shown at 393 which is two steps away from perforation 392. Upon operation of the reversal displacement key the strip is moved in reverse direction and when the said key is released it occupies the position shown at B, the last perforation 392 of the line being one step to the rear of the punch datum and thereby affording an appropriately positioned blank space for the single justification perforation. The operation of the single justification key effects a corresponding perforation and as the key is released the strip is moved in reverse direction to the position C, the single justification perforation being shown at 394. This leaves the second blank space on the punch datum ready to receive the double justification perforations. After operation of the double justification keys the replacement key is operated which causes the strip to be moved forwardly to position D in which the last character perforation 391 of the line is three spaces ahead of the punch datum ready to receive the first character perforation of the succeeding line. The previously made single and double justification perforations are shown at 394 and 395 respectively.

It will be understood that the invention is not limited to the use of rectilinear racks for determining the record strip travel, since other gauging or measuring means could be employed. Also the reversal and replacement travel of the record strip could be controlled by other means, for example as a result of the depression of the keys for effecting the double justification perforations.

Means is provided in accordance with the invention for varying the measure of line length by key operation when employing the improved keyboard mechanism with a make-up and correction apparatus as described in the specification of British patent application No. 13,961 of 1950 in the names of William Clowes & Sons Ltd. and Henry George Croucher. For this purpose the so-called tabulating attachment of the existing machine is utilised in the manner shown in Figure 25. Such attachment comprises essentially a rotatable shaft 396 carrying a disc 397 upon which are mounted stops 398 of different lengths which can be engaged, according to the position of the disc, by a projection 399 on the em rack 400. The em rack is the known rack for line measuring and is that referred to in British patent specifications Nos. 17,199 of 1908 (a duplicate of U. S. Patent 944,405) and 27,264 of 1913 (a duplicate of U. S. Patent 1,149,176, granted August 10, 1915), for example, so that further description thereof is not necessary. The shaft 396 carries four driving pinions 401, 402, 403 and 404 which engage the shaft through internal ratchets and are operated by displaceable racks 401a, 402a, 403a and 404a through the agency of air pistons 401b, 402b, 403b and 404b. The operation of these pistons is controlled by valves in the additional key bank actuated by the respective change keys referred to previously. The movement of the racks is limited by stops 405 and in their forward position the racks are held by a latch 406 which can be released by an air piston 407. Each rack has a return spring such as 408. The arrangement is such that operation of the required change key in the additional key bank will cause advance of the corresponding rack to position the attachment shaft 396 for the required travel of the em rack 400. The additional key bank also has a measure release key which operates the valve bar 304 (see Figure 18) to open the valve 305 controlling admission of air to the piston 407 which releases the latch 406 and allows the rack to return. The attachment shaft 396 is also returned to its initial position by a weight and cable arrangement indicated at 409. It will be understood that the em rack is that of the existing and known apparatus as previously defined, and is operated and functions in the same manner, so that further description is not required.

In conjunction with the above mechanism for variation of line measure, means is also provided for ensuring the changing of the known ready reckoner drum when the line measure is changed, as shown in Figure 26. The pistons 401b, 402b, 403b and 404b are arranged to engage a common movable plate 410 which is adapted, when displaced, to actuate a bell crank 411 linked to an arm 412 on a shaft 413. Secured to the shaft 413 is an arm 414 which lifts the drum 415 off its studs, thereby affording the desired indication. Also or alternatively, the shaft 413 may carry a quadrant 416 for actuating a shaft 417 which displaces a movable blind 418 to cover the effective portion of the drum. Replacement of the drum or the positioning of a new drum by the operator returns the leverage to its initial position.

A modified mechanism for varying the measure of line length, which is independent of the known tabulating attachment, is shown in Figure 27 as applied to the existing and known machine previously referred to, parts of which appear in the figure. A shaft 419 carries a disc 420 on which are mounted stop rods 421 which can be engaged by the projection 422 on the em rack 423 of the existing machine or apparatus. The foregoing remarks regarding the em rack apply also to this arrangement. Four cylinders and pistons are provided, one of which cylinders is shown at 442 and which actuates the rack 443 to move it against a stop 444. A pinion 445 is thereby rotated and this rotation is communicated to the shaft 419 through an internal ratchet device such as is shown at 446, 447 on the nearer pinion. Each rack has a tooth 448 by which it is held in advanced position by a latch 449. A fifth piston and cylinder 450 is provided for releasing the latch so that the racks can return to their initial positions by springs (not shown). The cylinder 442 is supplied with compressed air under the control of the valve 301 on the additional key bank, operated by its appropriate change key, and the other three cylinders in a similar manner. The cylinder 450 is supplied with compressed air under the control of the valve 305 of the additional key bank. When the said valve is opened by depression of the appropriate key, after the perforations for the required number of lines have been made, the racks (e. g. rack 443) are returned to their initial position and the projection 422 on the em rack 423 enters a recess 451 on the disc 420, so rendering the mechanism inoperative.

The arrangement also includes means whereby the required number of drums e. g. four, can be driven simultaneously from a single rack, and also means whereby the operator does not have to change his line of sight in order to read the ready reckoner drum corresponding to the line measure being employed. As shown in Figure 27 the em rack 423 is meshed with a pinion 452 connected to a pinion 453 which meshes with a rack 454 upon which is slidable a rider 455. The head of the rider 455 is engaged between a rod 456 and a stem 457 of a piston 458 which is slidable in a cylinder 459 exposed to compressed air at constant pressure. A piston in a cylinder 460 is arranged to drive against the rider 455 at 4½ ems from the end of the line during the normal setting operations and the rider takes along with it the piston 458 against its air pressure. A rack, part of which is shown at 461, engages the piston 458 and is loaded by a spring (not shown) so that it follows the movement of the said piston. The above described construction is that employed in the existing apparatus, the rack 461 being employed to control the known ready reckoner drum or justifying scale, and it will be understood that the parts 455, 456, and 458 are displaced under spring loading at the same rate of travel as the piston in the cylinder 460 during the line setting procedure, the said justifying scale drum revolving in correspondence thereto. The arrangement and operation of the aforesaid parts may be as described in the British patent specifications referred to previously. In accordance with the present invention the rack 461 is not employed for drum control but a separate rack 462 is attached to the part 461 by a threaded member 463 having a lock nut arrangement to afford adjustment. The rack 462 is loaded by a spring 464 connected to it by a post 465. A lug 466 performs the same function as the so-called cap of the existing mechanism, namely to act as a stop to the part 456 on the return motion of the latter.

The rack 462 is arranged to drive four (or more) ready reckoner or justifying scale drums 467, 468, 469 and 470 which are arranged upon a circular arc so that each is the same distance from a mirror 471. As the drive of each drum is similar, only that for the drum 467 will be described. The rack 462 meshes with a pinion 472 carrying a gear 473 which meshes with a pinion 473a driving the drum. This arrangement enables the drums to be disposed in the required circular arc. Each drum is positioned upon three pins or studs 474 secured to a plate 475 which is adjustable with respect to the pinion 473a, thereby allowing some adjustment of the individual drums relative to the mirror 471. To ensure that the rack 462 shall follow the movement of the piston 458 when this is displaced by the rider 455, the further end of said rack has attached to it a piston 476 operating in a cylinder 477 which is supplied with compressed air controlled by a valve 478 having a constant pressure supply from a pipe 479. This valve is opened against its loading spring 480 by a crank 481 bearing against a stem 482 of the valve under the influence of a stronger spring 483 acting on a depending arm 484 integral with the arm 481 which can oscillate on an axle 485. The lower end of the arm 484 can be engaged with the end of a latch 486 pivoted at 487 to hold the valve 478 closed. A lug 488 on the further end of the latch 486 is arranged to be engaged by a pin 489 on the em rack 423 to release the arm 484 and thereby cause opening of the valve at the required time by the movement of the em rack during line setting. The diameter of the piston 476 connected to the drum-actuating rack 462 is less than that of the piston 458 so that the movement of the rider 455 is always dependent upon the existing piston of cylinder 460 and not upon piston 476. The arrangement is such that the drums will be rotated by the rack 462 in a manner similar to that of the known drum of the existing machine and the start of their movement will be timed by the actuation of the latch 486. Any desired number of drums may be provided.

When a line has been set and justification has taken place the compressed air supply is cut off from the cylinder 460 and applied to a cylinder 490 which is part of the existing machine and which has a piston (not shown) for returning the rack 454 and the piston of the opposing cylinder 460. The constant air supply to the cylinder 459 drives the piston 458 forwardly so that the parts 455, 456 and 461 are displaced to the right as viewed in the figure until arrested by the stop lug 466. Before this can occur the air supply to the piston 476 attached to the drum actuating rack 462 must be cut off. This is effected by a projection 491 on the crank arm 484 and this is arranged to be engaged by an existing piston arrangement (not shown) which is employed to return the operating arm of the existing counter for line counting. The said piston is operated by compressed air when the keyboard restoring key is depressed, so that at this time the arm 484 is clear of the latching lever 486 and falls back to latched position when the said piston returns to its initial position. The piston 476 which actuates the drum rack 462 is provided with a spring 492 for taking up the recoil when the said rack is driven back against the said piston by the spring 464 and the air pressure on the piston 458. It will be seen that the foregoing arrangement enables any desired number of drums to be actuated without placing an undue strain on the existing mechanism.

The indicating means for the justifying scales of the drums are arranged and operated in a manner generally similar to that employed in the existing mechanism. A supply of compressed air controlled by the valve 310 in the additional key bank passes through a valve 493 which is normally open and thence through a pipe 494 to a piston 495 actuating a crank 496 having an arm 497 on which is pivotally mounted a spring loaded pawl 498 engaging a rack 499 which is thereby raised by one tooth every time the piston 495 is actuated. A retaining pawl 500, also spring loaded, is provided to hold the rack after actuation. Attached to the rack 499 is a segment shaped head 501 from which extend rods 502 corresponding to the various drums and each carrying at its end an indicator plate 503 through an aperture in which the scale figure on the drum can be read. The head 501 is also provided with corresponding magnifying lenses 504. The operator can observe the required drum through a fixed mirror 505 (along a line of sight indicated at 506) and a second mirror 471 mounted on a vertical and rotatable shaft 508 connected by gears 509, shaft 510 and gears 511 to the shaft 419 previously described which is set according to the line measure desired. Thus the operator will view the scale of the required drum only, according to the set position of the angularly adjustable mirror 471. After the justification perforations have been effected at the end of the line, the usual restoring key is depressed and this causes compressed air to be supplied to a pipe 512 for actuating a piston 513 which actuates through a crank 514, a bar 515 for disengaging the pawls 498 and 500 from the rack 499. The latter descends by gravity to bring the justifying scale indicators to zero, and its fall is cushioned by a rubber or other resilient element 516.

In the existing mechanism, a rack 517 is provided for determining whether justifying spaces or fixed six-unit spaces shall be put in the line when the justifying space bar is struck, and this control is retained in the present mechanism although the said rack is not used for actuating the justifying scale indicator. The existing knob 518 which determines fixed six-unit spaces, is engaged by a lever 519 pivoted at 520 and connected to the valve 493. Thus when the knob 518 is pulled out as in the existing mechanism, compressed air is cut off from the piston 495 of the present mechanism.

A modification of the above described arrangement is shown diagrammatically in Figure 28 and has also been embodied in Figure 27. Instead of an angularly adjustable mirror 471 there are provided a series of fixed mirrors 521, 522, 523 and 524, and a curved opaque screen 525 is arranged in front of the justifying scale drums having slots for each drum. These slots are partly covered by hinged spring loaded doors 526 leaving a narrow vertical slit 527 through which the scale can be viewed. These slits are covered, when the drum is not in use, by shutters 528 each carried on a pair of links 529 (see Figure 27) and connected by a rod 530 to a lever 531 pivoted at 532. The arrangement is such that downward movement of any of the levers 531 causes the shutter 528 to swing laterally on its links and thereby expose the slit 527.

The shaft 419 which as previously described is set to various angular positions according to the selected measure of line length has an extension 533 carrying cams 534 bearing on rollers 535 on the levers 531. The cams are arranged so that according to the position of the shaft 419, the slit of the selected drum will be open, the other drums being obscured. To ensure that only the indicated figure on the scale can be viewed by the operator, the apertured indicator plates 503 may be provided with extensions 536 which extend both upwardly and downwardly as shown in conjunction with the drum 469. The hinged doors 526 can be opened by finger levers 537 if the operator should require to refer to another part of the scale.

By the measure change and drum reading change means described above, an operator can set a normal copy of headlines, chapter heads, text, notes, and the like without any interruption other than depressing the required measure changing keys on the keyboard. The unbroken, continuously set record bearing means or paper strip so produced can be utilised with the apparatus described in the specification of British application No. 13,961 of 1950 in the names of William Clowes & Sons Ltd. and Henry George Croucher. Such a record-bearing means, containing many keyboard measures, provides an alternative method of making up to that described in the above mentioned specification, the record strip being used to control the usual tower of the existing apparatus. Corrections and insertions can be effected by means of an additional tower as described in the specification referred to above.

I claim:

1. A keyboard controlled mechanism for producing record-bearing means used in the production of typographical and like matter comprising, in combination, means for feeding a record-bearing means such as a strip, key controlled means for forming records at a fixed station on said record-bearing means corresponding to the characters required for variable lines of typographical matter and also for the determination of character spacing in such line of characters, means for reversely feeding the record bearing means, means for automatically determining the reverse feeding distance to have a relation with the forward feeding distance corresponding to the previously formed records for a line of characters such that the records which determine character spacing in the line are positioned in advance of the records of characters constituting such line, and means for subsequently returning the record-bearing means over an automatically determined distance to a position such that the commencement of the formation of character records for the succeeding line is spaced from the character records of the previous line so that the records which determine character spacing can be subsequently formed in such space.

2. Mechanism according to claim 1, comprising pinion actuated measuring racks operable and displaceable in accordance with the travel of the record-bearing means, stops to which said racks are returned, and means for adjusting the position of said stops prior to the return of the racks to engage said stops, said racks determining the reverse and return motions respectively of the record-bearing means, and the stop adjustments being determined so that said reverse and return motions are greater than the length of the records constituting a line of characters by amounts determined by the adjustment of the stops.

3. Mechanism according to claim 1, comprising measuring means actuated by the feeding means of the record-bearing means for determining the appropriate reverse and return travel of said means, air pistons for displacing said measuring means, valves for controlling the operation of said air pistons, and additional keys for actuating said valves.

4. Mechanism according to claim 1, in which the record-bearing means comprises a paper strip fed by a paper feed means having a main shaft, displaceable measuring means driven by the feed means for determining the appropriate reverse travel of said paper strip, displaceable measuring means driven by the feed means for determining the return travel of said paper strip, drive connections between said main shaft and each of said measuring means, and controlling clutches in said drive connections, the clutch for the first said measuring means being engaged upon operation of the means for reversely feeding the record-bearing means and the clutch for the second said measuring means being engaged upon operation of the means for returning the record-bearing means, whereby the displacements of said measuring means determine the reverse and return travel respectively of the strip.

5. Mechanism according to claim 1, comprising measuring means actuated from the feeding means for determining the reverse travel of the record-bearing means, measuring means also actuated from the feeding means for determining the return travel of the record-bearing means, a stop device for determining the displacement of the second mentioned measuring means, and means actuated by the displacement of the first mentioned measuring means for setting said stop device so that the return movement of the record-bearing means is such as to leave a blank space thereon before the formation of records corresponding to the succeeding line of typographical matter.

6. Mechanism according to claim 1, comprising measuring means actuated from the feeding means for determining the reverse travel of the record-bearing means, measuring means also actuated from the feeding means for determining the return travel of the record-bearing means, a settable stop device for determining the displacement of the second mentioned measuring means, means actuated by the displacement of the first mentioned measuring means for setting said stop device so that return movement of the record-bearing means is such as to leave a blank space thereon before the formation of records corresponding to the succeeding line of typographical matter, a key for controlling actuation of the first mentioned measuring means, means for locking the feeding means, and means actuated by operation of said key for unlocking said locking means.

7. Mechanism according to claim 1, comprising measuring means actuated from the feeding means for determining the reverse travel of the record-bearing means, measuring means also actuated from the feeding means for determining the return travel of the record-bearing means, a stop device for determining the displacement of the second mentioned measuring means, means actuated by the displacement of the first mentioned measuring means for setting said stop device so that the return movement of the record-bearing means is such as to leave a blank space thereon before the formation of records corresponding to the succeeding line of typographical matter, and means for controlling the operation of the feeding means actuatable by said first mentioned measuring means when reaching its end position to cause the feeding means to return to operative position.

8. Mechanism according to claim 1, comprising measuring means actuated from the feeding means for determining the reverse travel of the record-bearing means, measuring means also actuated from the feeding means for determining the return travel of the record-bearing means, a settable stop device for determining the displacement of the second mentioned measuring means, means actuated by the displacement of the first mentioned measuring means for setting said stop device so that the return movement of the record-bearing means is such as to leave a blank space thereon before the formation of records corresponding to the succeeding line of typographical matter, means for disconnecting the drive between said first mentioned measuring means and the feeding means, and means actuated by said measuring means on reaching its end position for effecting such disconnection.

9. Mechanism according to claim 1, comprising measuring means actuated by the feeding means for effecting the return movement of the record-bearing means, measuring means also actuated by the feeding means for effecting the reverse movement of the record-bearing means, a settable stop device for determining the travel of the second mentioned measuring means, and means actuated by said first mentioned measuring means for effecting a drive connection between said second mentioned measuring means and the feeding means, for disconnecting a drive connection between said first mentioned measuring means and the feeding means, and for setting the said stop device.

10. Mechanism according to claim 1, comprising measuring means actuated from the feeding means for determining the reverse travel of the record-bearing means, measuring means also actuated form the feeding means for determining the return travel of the record-bearing means, a settable stop device comprising a threaded member actuated by a spring loaded rack and pinion arrangement for determining the displacement of the second mentioned measuring means, latches for holding the said racks against their spring loading, and means actuated by the displacements of the measuring means for releasing the said latches and thereby setting the stop device, the setting being such that the return movement of the record-bearing means is determined so as to leave a blank space thereon before the formation of records corresponding to the succeeding line of typographical matter.

11. Mechanism according to claim 1, comprising measuring means actuated from the feeding means for determining the reverse travel of the record-bearing means, measuring means also actuated from the feeding means for determining the return travel of the record-bearing means, a settable stop device for determining the displacement of the second mentioned measuring means, means actuated by the displacement of the first mentioned measuring means for setting said stop device so that the return movement of the record-bearing means is such as to leave a blank space thereon before the formation of records corresponding to the succeeding line of typographical matter, a key for controlling actuation of the first mentioned measuring means, means for locking the feeding means, a compressed air actuated piston controlled by said key for unlocking said locking means, and a latch for holding said locking means in unlocked position, said latch being releasable by displacement of the first mentioned measuring means.

12. Mechanism according to claim 1, comprising measuring means actuated from the feeding means for determining the reverse travel of the record-bearing means, measuring means also actuated from the feeding means for determining the return travel of the record-bearing means, a settable stop device for determining the displacement of the second mentioned measuring means, means actuated by the displacement of the first mentioned measuring means for setting the said stop device so that the return movement of the record-bearing means is such as to leave a blank space thereon before the formation of records corresponding to the succeeding line of typographical matter, means for disconnecting the drive between said first mentioned measuring means and the feeding means, a compressed air piston arrangement for engaging said drive disconnecting means, a latch for holding said means in engagement, and means actuated by said first mentioned measuring means on reaching its end position for disengaging said latch.

13. Mechanism according to claim 1, comprising measuring means actuated by the feeding means for effecting the return movement of the record-bearing means, measuring means also actuated by the feeding means for effecting the reverse movement of the record-bearing means, a disconnectable drive connection between said second mentioned measuring means and the feeding means, a compressed air piston arrangement for engaging said drive connection, and a valve controlling an air supply to said piston actuatable by movement of said first mentioned measuring means.

14. Mechanism according to claim 1, comprising measuring means actuated by the feeding means for effecting the return movement of the record-bearing means, measuring means also actuated by the feeding means for effecting the reverse movement of the record-bearing means, and means actuated by said first mentioned measuring means for effecting a drive connection between said second mentioned measuring means and the feeding means and for disconnecting a drive connection between said first mentioned measuring means and the feeding means, said disconnection being effected by the release of a latch holding a compressed air operated piston which effects the engagement of the drive.

15. Mechanism according to claim 1, comprising measuring means actuated from the feeding means for determining the reverse travel of the record-bearing means, measuring means also actuated from the feeding means for determining the return travel of the record-bearing means, a settable stop device comprising a threaded member rotatable by a spring loaded rack and pinion arrangement for determining the travel of the second mentioned measuring means, a compressed air actuated piston arrangement for setting the stop device, and a valve for controlling the operation of said piston arrangement.

16. Mechanism according to claim 1, in which the record-bearing means comprises a paper record strip in which a loop is formed upon reverse feeding of said strip, and the said loop is controlled by a gravity roller engaging in the loop and slidable in guides.

17. Mechanism according to claim 1, in which the record-bearing means comprises a paper record strip capable of receiving perforations, and a winder is provided for taking up the loop in the strip after perforation thereof, comprising means controlled by the replacement motion of the record strip after reversal thereof for driving the said winder to take up the loop formed on reversal preparatory to the formation of the perforations corresponding to the succeeding line of typographical matter.

18. Mechanism according to claim 1, in which the record-bearing means comprises a record strip, comprising means for locking the record strip feeding mechanism during the period when reversal and replacement of the said strip is being effected.

19. Mechanism according to claim 1, in which the record-bearing means comprises a record strip and the record strip feeding mechanism includes a locking mechanism, comprising a pair of manually operable keys for controlling the reversal and replacement motions of the record strip, a compressed air piston arrangement controlled by said keys, and an operative connection between said piston and the locking mechanism, whereby the feeding mechanism is locked when reversal and replacement of the record strip is being effected.

20. Mechanism according to claim 1, in which the record-bearing means comprises a record strip, comprising forward and reverse ratchet wheels associated with the record strip feeding mechanism for imparting step by step motion to the strip sets of forward and reverse feeding pawls carried on a member movable to bring either set of pawls into engagement with its corresponding ratchet wheel, a compressed air mechanism for actuating said movable member, and a valve for controlling said mechanism, whereby operation of said valve enables a reverse step by step motion to be imparted to the strip.

21. Mechanism according to claim 1, in which the record-bearing means comprises a record strip, comprising forward and reverse ratchet wheels associated with the record strip feeding mechanism for imparting step by step motion to the strip, sets of forward and reverse feeding pawls carried on a member movable to bring either set of pawls into engagement with its corresponding ratchet wheel, a compressed air mechanism for actuating said movable member, a valve for controlling said mechanism whereby operation of said valve enables a reverse step by step motion to be imparted to the strip, sets of forward and reverse feeding pawls carried on a member movable to bring either set of pawls into engagement with its corresponding ratchet wheel, a compressed air mechanism for actuating said movable member, a valve for controlling said mechanism whereby operation of said valve enables a reverse step by step motion to be imparted to the strip, and means for withdrawing the pawls from engagement with their corresponding ratchet wheels.

22. Mechanism according to claim 1, in which the record-bearing means comprises a record strip, further comprising forward and reverse ratchet wheels associated with the record strip feeding mechanism for imparting step by step motion to the strip, sets of forward and reverse feeding pawls carried on a member movable to bring either set of pawls into engagement with its corresponding ratchet wheel, a compressed air mechanism for actuating said movable member, a valve for controlling said mechanism whereby operation of said valve enables a reverse step by step motion to be imparted to the strip, means for withdrawing the pawls from the engagement with their corresponding ratchet wheels, a winder for taking up the record strip after perforation thereof, a ratchet wheel and feed pawl means for actuating said winder, and means for simultaneously withdrawing from operative association with their ratchet wheels the pawl means of the strip feeding mechanism and of the winder.

23. Mechanism according to claim 1, in which the record-bearing means comprises a record strip and the feeding means is adapted to feed such strip in a step by step manner, comprising means operable by an additional key for effecting a reversed step motion of the strip without perforation thereof, said means comprising a valve bar operable by said additional key to open a valve, and a compressed air piston controlled by said valve for controlling the reversal movement of the record strip feeding mechanism.

24. Mechanism according to claim 1, in which the record-bearing means comprises a record strip and the feeding means is adapted to feed such strip in a step by step manner, comprising an additional manually operable key, a valve bar operable by said key, a valve opened by operation of said valve bar, a compressed air operated piston controlled by said valve for controlling the reversal movement of the record strip feeding mechanism, two rock shafts actuatable by said valve bar, and further valve bars actuatable by said rock shafts, and a record strip feed cam plate associated with the strip feeding mechanism and operated as a result of actuation of said further valve bars to prevent perforation of the strip during the reverse step movement thereof.

25. Mechanism according to claim 1, in which the record-bearing means comprises a record strip and the feeding means is adapted to feed such strip in a step by step manner, comprising an additional manually operable key, a valve bar operable by said key, a valve opened by operation of said valve bar, a compressed air operated piston controlled by said valve for controlling the reversal movement of the record strip feeding mechanism, a latch for holding said piston when operated to prevent its return, two rock shafts actuatable by said valve bar, further valve bars actuatable by said rock shafts, a record strip feed cam plate associated with the strip feeding mechanism and operated as a result of actuation of said further valve bars to prevent perforation of the strip during the reverse step movement thereof, and means on the feed rod of the strip feeding mechanism for releasing the said latch when the rod is moved downwardly for effecting a normal forward feeding step of the record strip.

26. Mechanism according to claim 1, in which the record-bearing means comprises a record strip and the feeding means is adapted to feed such strip in a step by step manner, further comprising means for displacing the record strip stepwise in reverse direction, operation of said means being controlled by operation of a justification perforation key.

27. Mechanism according to claim 1, in which the record-bearing means comprises a record strip and the feeding means is adapted to feed such strip in a step by step manner, further comprising means for displacing the record strip stepwise in a reverse direction, an additional key for controlling said means, a rock shaft operable by said key, and a valve bar operated by a single justification perforation key and having a lug for engaging and operating said rock shaft, whereby operation of said justification key causes the record strip to be moved to a position to receive the following double justification perforations in the blank space thereof.

28. Mechanism according to claim 1, in which the record-bearing means comprises a record strip and the feeding means is adapted to feed such strip in a step by step manner, further comprising means for displacing the record strip stepwise in a reverse direction, an additional key for controlling said means, a rock shaft operable by said key, and a valve bar operated by a single justification perforation key and having a lug for engaging and operating said rock shaft, whereby operation of said justification key causes the record strip to be moved to a position to receive the following double justification perforations in the blank space thereof, said valve bar being adjustable so that it can be rendered inoperative if desired.

29. Mechanism according to claim 1, in which the record-bearing means comprises a record strip and including means for locking the strip feeding means, further comprising means dependent upon the number of groups of records such as perforations corresponding to lines formed on the strip for actuating said locking means to lock the feeding means after a predetermined number of said groups have been formed on the strip.

30. Mechanism according to claim 1, in which the record-bearing means comprises a record strip and including means for locking the strip feeding means, further comprising a counter for counting the number of groups of records such as perforations corresponding to lines formed on the strip, an arm on said counter actuated after a predetermined number of counts, and an operative connection between said arm and a locking rack of the record strip feeding mechanism.

31. Mechanism according to claim 1, in which the record-bearing means comprises a record strip, comprising a counter for counting the number of groups of records corresponding to lines formed on said strip, and means for actuating said counter, said means being operated only when both single and double justification keys are depressed simultaneously.

32. Mechanism according to claim 1, in which the record-bearing means comprises a record strip, comprising a counter for counting the number of groups of records corresponding to lines formed on said strip, and means for actuating said counter, said means including a pivoted lever on a slidable member, and single and double justifying bars of the keyboard engageable with said lever, the arrangement being such that said slidable member is actuated for counter operation only when both said bars are advanced simultaneously.

33. Mechanism according to claim 1, comprising a restoring key, a valve bar actuated by said restoring key, means on said valve bar for actuating a rock shaft, a second rock shaft coupled to said first rock shaft, and valves actuated by said second rock shaft for controlling compressed air mechanism for effecting the replacement motion of the record-bearing means.

34. Mechanism according to claim 1, in which the record-bearing means comprises a strip which is perforated by punch means and the length of a group of perforations corresponding to a line is controlled by a line measuring em rack, comprising means for locking the punch means, means for retaining said locking means in locked position, and means for releasing said retaining means when the em rack returns to its limit position, whereby the operator is prevented from setting a short line.

35. Mechanism according to claim 1, in which the record-bearing means comprises a strip which is perforated by punch means and the length of a group of perforations corresponding to a line is controlled by a line measuring em rack, comprising means including a stop rack for locking the punch means, latch means for retaining said stop rack in locking position, and a member engageable by the em rack and arranged to trip said latch means when the em rack reaches its end position, whereby the operator is prevented from setting a short line.

36. Mechanism according to claim 1, in which the record-bearing means comprises a strip which is perforated by punch means and the length of a group of perforations corresponding to a line is controlled by a line measuring em rack, comprising means including a stop rack for locking the punch means, latch means for retaining said stop rack in locking position, a member engageable by the em rack and arranged to trip said latch means when the em rack reaches its end position, a member for actuating the stop rack, and means for releasing the stop rack upon return movement of the member for actuating the same, said member being connected to a crank engageable in a slot associated with the said rack, and an interposable member is movable to occupy said slot when the rack locking movement takes place.

37. Mechanism according to claim 1, in which the record-bearing means comprises a perforable strip and the strip feeding means is actuated by air operated pistons, comprising additional air operated pistons for reinforcing the feeding capacity of the feeding means.

38. Mechanism according to claim 1, in which the record-bearing means comprises a perforable strip and the strip feeding means is actuated by air operated pistons through a pivoted lever, comprising additional air operated pistons connected to a pivoted lever which is cross connected with the first said lever, and plate means provided with additional air ports for controlling admission of air to said additional pistons.

39. Mechanism according to claim 1, in which the keyboard includes key actuated key bars, key bar actuated rock shafts, and rock shaft actuated valve bars, comprising means for actuating a key bar, in addition to normal key actuation, from a valve bar through the medium of interposed rock shaft means.

40. Mechanism according to claim 1, in which the keyboard includes key actuated key bars, key bar actuated rock shafts, and rock shaft actuated valve bars, comprising means for actuating a key bar, in addition to normal key actuation, from a valve bar through the medium of interposed rock shaft means, at least one of the operable bars being provided with adjustable actuating lug means capable of being moved to either operative or inoperative position.

41. Mechanism according to claim 1, in which the keyboard includes key actuated key bars, key bar actuated rock shafts, and rock shaft actuated valve bars, comprising means for varying a line measure controlling means, keys for controlling said varying means, a key actuatable bar for adjusting a character characteristic such as width, spacing, depth and the like, a key for actuating said bar, and means for actuating said key actuatable bar upon operation of any one of the line measure controlling keys.

42. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and comprising a line justifying scale drum, a cover associated with said drum, and means operated by the line measure varying means for displacing the cover to warn the operator when the line measure is changed.

43. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and comprising a plurality of line justifying scale drums and means for rotating said drums simultaneously.

44. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and comprising a plurality of line justifying scale drums, means for rotating said drums simultaneously and reflector means for viewing the drums indirectly, said reflector means including angularly adjustable reflector means adjustable in accordance with the line measure selected so that only the appropriate drum can be viewed by the operator.

45. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and comprising a plurality of line justifying scale drums, means for rotating said drums simultaneously, movable shielding means for each of the drums, and means actuated from the line measure changing means so that only the selected drum can be viewed by the operator.

46. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and comprising a plurality of line justifying scale drums, means for rotating said drums simultaneously, a scale indicator for each drum, a common member carrying the scale indicators of all the drums, and means for raising said member step by step as line setting proceeds.

47. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and comprising a plurality of line justifying scale drums, means for rotating said drums simultaneously, a scale indicator for each drum, a common member carrying the scale indicators of all the drums, means for raising said member step by step as line setting proceeds, and manually operable means for interrupting the said step by step rising movement when required.

48. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and comprising a plurality of line justifying scale drums, means for rotating said drums simultaneously, a scale indicator for each drum, a common member carrying the scale indicators of all the drums, and means for raising said member step by step as line setting proceeds, said means including a compressed air operated piston actuating a ratchet engaging a toothed rack, and a valve in the controlling air line to said piston operable manually for closing the valve when desired.

49. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the keyboard includes key actuated key bars, key bar actuated rock shafts, and rock shaft actuated valve bars, comprising means for actuating a key bar, in addition to normal key actuation, from a valve bar through the medium of interposed rock shaft means, at least one of the operable bars being provided with adjustable actuating lug means capable of being moved to either operative or inoperative position.

50. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the keyboard includes key actuated key bars, key bar actuated rock shafts, and rock shaft actuated valve bars, comprising means for varying a line measure controlling said varying means, a key actuatable bar for adjusting a character characteristic such as width, spacing, depth and the like, a key for actuating said bar, and means for actuating said key actuatable bar upon operation of any one of the line measure controlling keys.

51. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the record-bearing means comprises a record strip and including means for locking the strip feeding means, further comprising means dependent upon the number of groups of records such as perforations formed on the strip for actuating said locking means to lock the feeding means after a predetermined number of said groups have been formed on the strip.

52. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the record-bearing means comprises a record strip and including means for locking the strip feeding means, further comprising a counter for counting the number of groups of records such as perforations corresponding to lines formed on the strip, an arm on said counter actuated after a predetermined number of counts, and an operative connection between said arm and a locking rack of the record strip feeding mechanism.

53. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the record-bearing means comprises a record strip, further comprising a counter for counting the number of groups of records corresponding to lines formed on said strip, and means for actuating said counter, said means being operated only when both single and double justification keys are depressed simultaneously.

54. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the record-bearing means comprises a strip which is perforated by punch means and the length of a group of perforations corresponding to a line is controlled by a line measuring em rack, comprising means for locking the punch means, means for retaining said locking means in locked position, and means for releasing said retaining means when the em rack returns to its limit position, whereby the operator is prevented from setting a short line.

55. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the record-bearing means comprises a strip which is perforated by punch means and the length of a group of perforations corresponding to a line is controlled by a line measuring em rack, comprising means including a stop rack for locking the punch means, latch means for retaining said stop rack in locking position and a member engageable by the em rack and arranged to trip said latch means when the em rack reaches its end position, whereby the operator is prevented from setting a short line.

56. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the record-bearing means comprises a strip which is perforated by punch means and the length of a group of perforations corresponding to a line is controlled by a line measuring em rack, comprising means including a stop rack for locking the punch means, latch means for retaining said stop rack in locking position, a member engageable by the em rack and arranged to trip said latch means when the em rack reaches its end position, a member for actuating the stop rack, and means for releasing the stop rack upon return movement of the member for actuating the same, said member being connected to a crank engageable in a slot associated with said rack, and an interposable member is movable to occupy said slot when the rack locking movement takes place.

57. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and comprising additional controlling keys, and means actuatable by said additional keys for effecting, by the depression of each single additional key, a combination of records obtainable by the existing keys, said means including a key bar actuatable by each additional key, and each of said key bars having lugs for actuating rock shafts, and said rock shafts being coupled to rock shafts associated with valve bars corresponding to the desired combination of records.

58. A keyboard controlled mechanism for producing record-bearing means used in the production of typographical matter comprising, in combination, means for feeding a record-bearing means such as a strip, key controlled means for forming records on said record-bearing means corresponding to the characters required for lines of typographical matter, line measure control means for determining the lengths of the groups of records corresponding to lines and hence the lengths of lines of typographical matter eventually formed from said record-bearing means, means for varying the effect of the line measure control means, and measure changing keys for bringing into operation such measure changing means, and in which the record-bearing means comprises a perforable strip, comprising a supply spool for the strip, means for perforating the strip, means for locking the said perforating means, means bearing on said supply spool and operatively connected to said locking means to prevent perforation from being effected by the operator when the spool has become exhausted, and manually operable means for unlocking said locking means.

References Cited in the file of this patent

UNITED STATES PATENTS

| | | |
|---|---|---|
| 702,568 | Lanston | June 17, 1902 |
| 1,082,642 | Marek | Dec. 30, 1913 |
| 1,434,114 | Greer | Oct. 31, 1922 |
| 1,600,938 | Garda | Sept. 21, 1926 |
| 1,939,717 | Morse | Dec. 19, 1933 |
| 1,968,059 | Sylvester et al. | July 31, 1934 |
| 2,174,686 | Carroll | Oct. 3, 1939 |
| 2,285,206 | Indahl | June 2, 1942 |
| 2,294,385 | Colman | Sept. 1, 1942 |
| 2,346,267 | Mills | Apr. 11, 1944 |